US009090409B2

(12) United States Patent
Matsumoto

(10) Patent No.: US 9,090,409 B2
(45) Date of Patent: Jul. 28, 2015

(54) STOPPING APPARATUS AND STOP-CANCELING METHOD

(71) Applicant: HIRATA CORPORATION, Shinagawa-ku (JP)

(72) Inventor: Bungo Matsumoto, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 0 days.

(21) Appl. No.: 14/260,604

(22) Filed: Apr. 24, 2014

(65) Prior Publication Data
US 2014/0231219 A1 Aug. 21, 2014

Related U.S. Application Data

(63) Continuation of application No. 14/023,923, filed on Sep. 11, 2013, now Pat. No. 8,770,383, which is a continuation of application No. PCT/JP2012/001984, filed on Mar. 22, 2012.

(30) Foreign Application Priority Data

Mar. 23, 2011 (WO) .................. PCT/JP2011/001692

(51) Int. Cl.
*B65G 15/64* (2006.01)
*B65G 47/88* (2006.01)
*B65G 47/29* (2006.01)

(52) U.S. Cl.
CPC ............ *B65G 47/8823* (2013.01); *B65G 47/29* (2013.01); *B65G 47/8807* (2013.01)

(58) Field of Classification Search
USPC ...................... 198/345.1, 459.6, 459.7, 463.4; 193/35 A, 35 G, 40
See application file for complete search history.

(56) References Cited

U.S. PATENT DOCUMENTS

| 3,830,409 | A | * | 8/1974 | Jenkinson ...................... 221/236 |
| 5,211,276 | A | * | 5/1993 | Clopton ...................... 198/345.3 |
| 5,676,235 | A | * | 10/1997 | Sam et al. .................. 198/345.3 |
| 5,860,505 | A | * | 1/1999 | Metzger ...................... 198/463.4 |
| 5,911,297 | A | * | 6/1999 | Unterhuber ................. 193/35 A |

(Continued)

FOREIGN PATENT DOCUMENTS

| EP | 1 522 383 A2 | 4/2005 |
| JP | 47-038384 B | 9/1972 |

(Continued)

OTHER PUBLICATIONS

Chinese Office Action dated Aug. 28, 2014 issued in the corresponding Chinese Patent Application No. 201280014520.7.

(Continued)

*Primary Examiner* — Douglas Hess
(74) *Attorney, Agent, or Firm* — Buchanan Ingersoll & Rooney PC

(57) ABSTRACT

A work stopping apparatus according to this invention includes a swing unit pivotable about a first pivot shaft between an abutment position and a retracted position, and a driving unit pivoting the swing unit. The swing unit includes a swing portion and a movable portion including a work abutment portion. The movable portion is pivotable about a second pivot shaft parallel to the first pivot shaft. A distance between the first pivot shaft and the work abutment portion becomes short along with pivoting motion of the swing unit from the abutment position to the retracted position.

8 Claims, 14 Drawing Sheets

(56) References Cited

U.S. PATENT DOCUMENTS

| | | | | |
|---|---|---|---|---|
| 6,119,843 | A * | 9/2000 | Robinson | 193/35 A |
| 6,164,430 | A * | 12/2000 | Nishimura | 198/345.1 |
| 6,220,418 | B1 | 4/2001 | Moradians | |
| 7,111,721 | B1 * | 9/2006 | Turner | 198/345.3 |
| 7,249,666 | B1 * | 7/2007 | Robinson | 193/35 A |
| 7,380,649 | B2 * | 6/2008 | Lauyans | 198/345.3 |
| 7,484,615 | B2 * | 2/2009 | Miyamoto | 198/345.1 |
| 7,513,355 | B2 * | 4/2009 | Unterhuber | 198/345.3 |
| 7,565,960 | B2 | 7/2009 | Worner et al. | |
| 7,938,246 | B2 * | 5/2011 | Lindemann et al. | 198/345.3 |
| 7,975,825 | B2 * | 7/2011 | Lindemann et al. | 193/35 A |
| 8,376,122 | B2 * | 2/2013 | Matsumoto | 198/463.4 |
| 8,708,131 | B2 * | 4/2014 | Fukano et al. | 198/345.1 |
| 8,770,383 | B2 * | 7/2014 | Matsumoto | 198/459.6 |
| 2008/0073180 | A1 | 3/2008 | Unterhuber | |
| 2009/0159393 | A1 | 6/2009 | Lindemann et al. | |

FOREIGN PATENT DOCUMENTS

| | | |
|---|---|---|
| JP | 59-156026 U | 10/1984 |
| JP | 61-176118 U | 11/1986 |
| JP | S63-094653 A | 4/1988 |
| JP | 5-086923 U | 11/1993 |
| JP | 6-016233 A | 1/1994 |
| JP | H07-157049 A | 6/1995 |
| JP | 8-319023 A | 12/1996 |
| JP | H10-017141 A | 1/1998 |
| JP | 11-227937 A | 8/1999 |
| JP | 2006-076767 A | 3/2006 |
| JP | 2009-173417 A | 8/2009 |

OTHER PUBLICATIONS

International Search Report (PCT/ISA/210) mailed on Jun. 19, 2012, by the Japanese Patent Office as the International Searching Authority for International Application No. PCT/JP2012/001984.

Written Opinion (PCT/ISA/237) mailed on Jun. 19, 2012, by the Japanese Patent Office as the International Searching Authority for International Application No. PCT/JP2012/001984.

Japanese Office Action dated May 22, 2015 issued in the corresponding Japanese Patent Application No. 2014-166981 (3 pages).

* cited by examiner

STOPPING APPARATUS AND STOP-CANCELING METHOD

This application is a continuation of U.S. patent application Ser. No. 14/023,923, filed Sep. 11, 2013, which is a continuation of International Patent Application No. PCT/JP2012/001984 filed on Mar. 22, 2012, and claims priority to International Patent Application No. PCT/JP2011/001692 filed on Mar. 23, 2011. The disclosure of the prior applications is hereby incorporated by reference herein in their entirety.

BACKGROUND OF THE INVENTION

1. Field of the Invention

The present invention relates to a stopping apparatus which abuts against a work being conveyed to stop the work.

2. Description of the Related Art

There is known a stopping apparatus for stopping, at a predetermined position, a work being conveyed on a conveying apparatus such as a roller conveyor (Japanese Patent Laid-Open Nos. 6-16233, 8-319023 and 11-227937). The stopping apparatus stops a work or cancels the stop of the work by moving an abutment portion such as a roller which abuts against the work onto a conveying apparatus or retracting it from the conveying apparatus. For this reason, a mechanism and actuator for moving the abutment portion are required.

As the mechanism for moving the abutment portion onto the conveying apparatus or retracting it from the conveying apparatus, a structure by which the abutment portion is reciprocally moved along a straight line and a structure by which the abutment portion is reciprocally moved by pivoting motion (this will be referred to as a pivot type hereinafter) are proposed. The pivot type can retract the abutment portion with a smaller force than that of the structure by which the abutment portion is reciprocally moved along the straight line.

In the pivot type, a pivot shaft is located on the upstream or downstream side of the abutment portion in a convey direction below a convey surface. In the structure in which the pivot shaft is located on the upstream side of the abutment portion, the pivot shaft is located in a region below the work which abuts against the abutment portion and is stopped. However, the region below the work is often used as a space in which an apparatus for lifting the stopped work or various sensors for confirming the stop of the work are disposed. For this reason, it is often difficult to ensure a space in which the stopping apparatus is disposed.

In the structure in which the pivot shaft is located on the downstream side of the abutment portion, when retracting the abutment portion, the abutment portion draws an arcuate moving locus along which the abutment portion slightly moves toward the upstream side. For this reason, the work is slightly pushed back to the upstream side. An extra actuator output is required by this push-back force.

SUMMARY OF THE INVENTION

It is an object of the present invention to employ a lower-output actuator as the actuator of a stopping apparatus.

According to the present invention, there is provided a stopping apparatus that abuts against a work being conveyed to stop the work, comprising a swing unit that is pivotable about a first pivot shaft on a downstream side of a predetermined stop position in a convey direction of the work between an abutment position where the swing unit abuts against the work being conveyed at the predetermined stop position to stop conveyance of the work and a retracted position which allows passage of the work, and a driving unit that pivots the swing unit, wherein the swing unit comprises a swing portion that is pivotable about the first pivot shaft, and a movable portion including an abutment portion which abuts against the work, and wherein the movable portion is connected to the swing portion to be pivotable through a second pivot shaft parallel to the first pivot shaft so that a distance between the first pivot shaft and the work abutment portion becomes shorter along with pivoting motion of the swing unit from the abutment position to the retracted position.

According to the present invention, there is also provided a stopping apparatus that abuts against a work being conveyed to stop the work, comprising a swing unit including a work abutment portion that abuts against the work being conveyed at a predetermined stop position to stop conveyance of the work, the swing unit being pivotable about a first pivot shaft on a downstream side of the predetermined stop position in a convey direction of the work between an abutment position where the work abutment portion protrudes above a lower surface of the work and a retracted position where the work abutment portion moves below the lower surface of the work to allow passage of the work, and a driving unit that pivots the swing unit, wherein the swing unit comprises a swing portion pivotable about the first pivot shaft and a movable portion including the work abutment portion, wherein the movable portion is connected to the swing portion to be pivotable through a second pivot shaft parallel to the first pivot shaft so as to shorten a distance between the first pivot shaft and the work abutment portion along with pivoting motion of the swing unit from the abutment position to the retracted position.

According to the present invention, there is also provided a stop-canceling method for causing a stopping apparatus to abut against a work being conveyed to stop the work and then canceling a stop of the work, the stopping apparatus comprising a swing unit including a work abutment portion that abuts against the work, the swing unit being pivotable about a first pivot shaft on a downstream side of a predetermined stop position in a convey direction of the work between an abutment position where the swing unit abuts against the work being conveyed at the predetermined stop position to stop conveyance of the work and a retracted position which allows passage of the work, the stop-canceling method comprises a stop-canceling step of, so as to cancel the stop of the work, pivoting the swing unit located at the abutment position to the retracted position about the first pivot shaft, and at the same time bending the swing unit at an intermediate portion between the first pivot shaft and the work abutment portion so as to shorten a distance between the first pivot shaft and the work abutment portion along with pivoting motion of the swing unit from the abutment position to the retracted position.

According to the present invention, there is also provided a stop-canceling method for causing a stopping apparatus to abut against a work being conveyed to stop the work and then canceling a stop of the work, the stopping apparatus comprising a swing unit including a work abutment portion that abuts against the work being conveyed at a predetermined stop position to stop conveyance of the work, the swing unit being pivotable about a first pivot shaft on a downstream side of the predetermined stop position in a convey direction of the work between an abutment position where the work abutment portion protrudes above a lower surface of the work and a retracted position where the work abutment portion moves below the lower surface of the work to allow passage of the work, the stop-canceling method comprises a stop-canceling step of, so as to cancel the stop of the work, pivoting the swing unit located at the abutment position to the retracted position about the first pivot shaft, and at the same time bending the swing unit at an intermediate portion between the first pivot shaft and the work abutment portion so as to shorten a distance between the first pivot shaft and the work abutment portion along with pivoting motion of the swing unit from the abutment position to the retracted position.

DESCRIPTION OF THE EMBODIMENTS

First Embodiment

Figure 1:
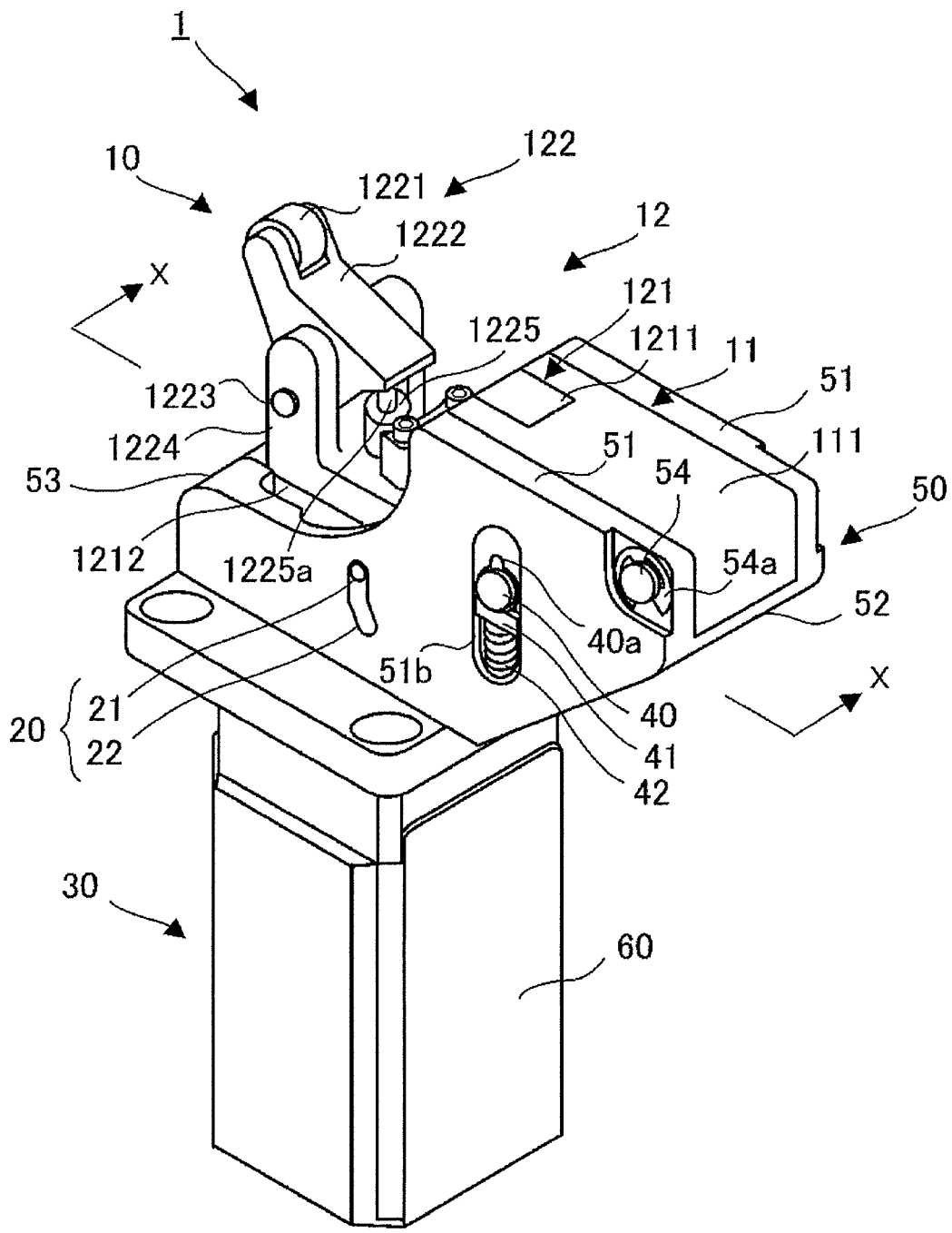
FIG. 1 is a perspective view of a stopping apparatus according to an embodiment of the present invention.
Figure 2:
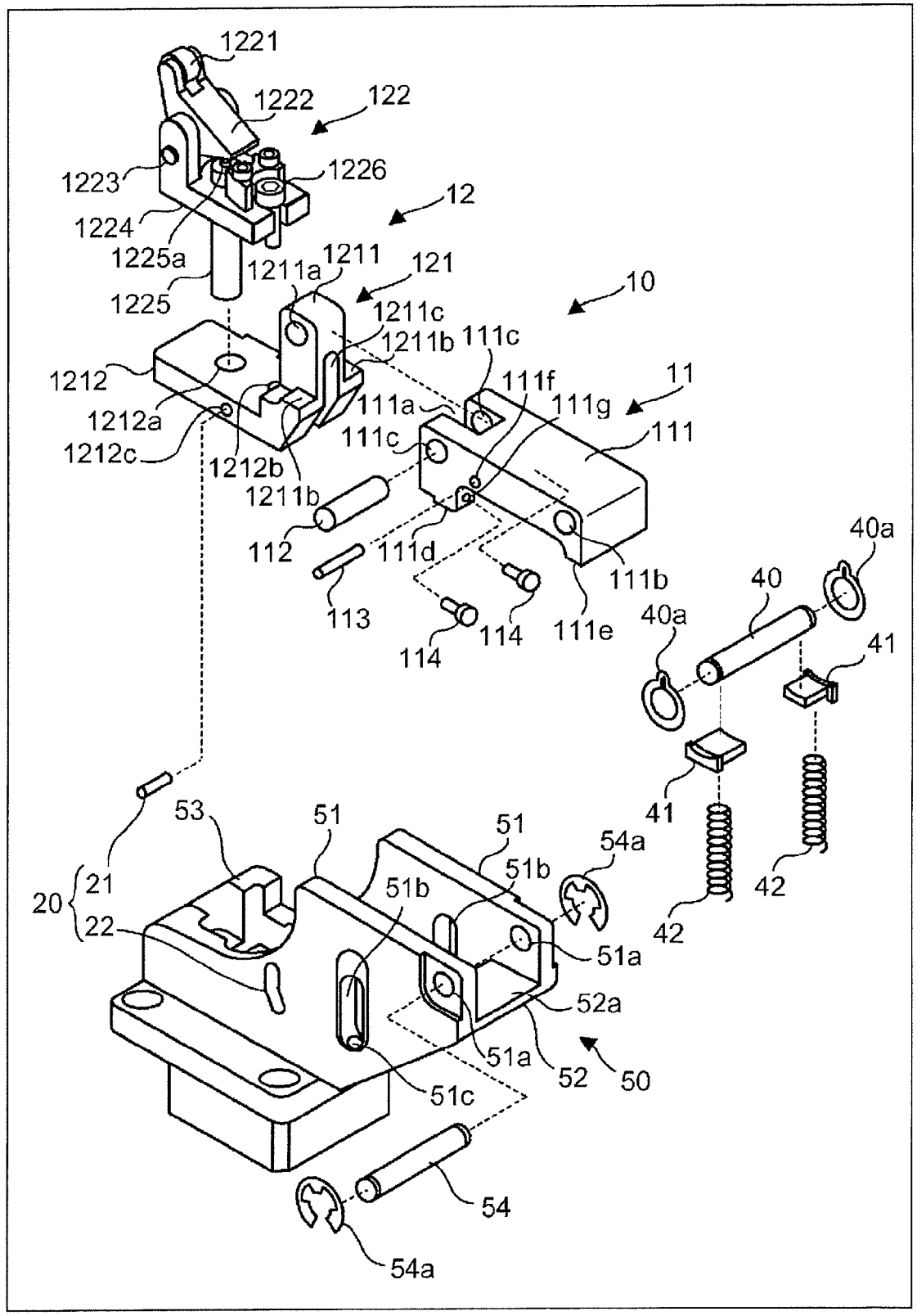
FIG. 2 is an exploded perspective view of the stopping apparatus shown in FIG. 1.
Figure 3:
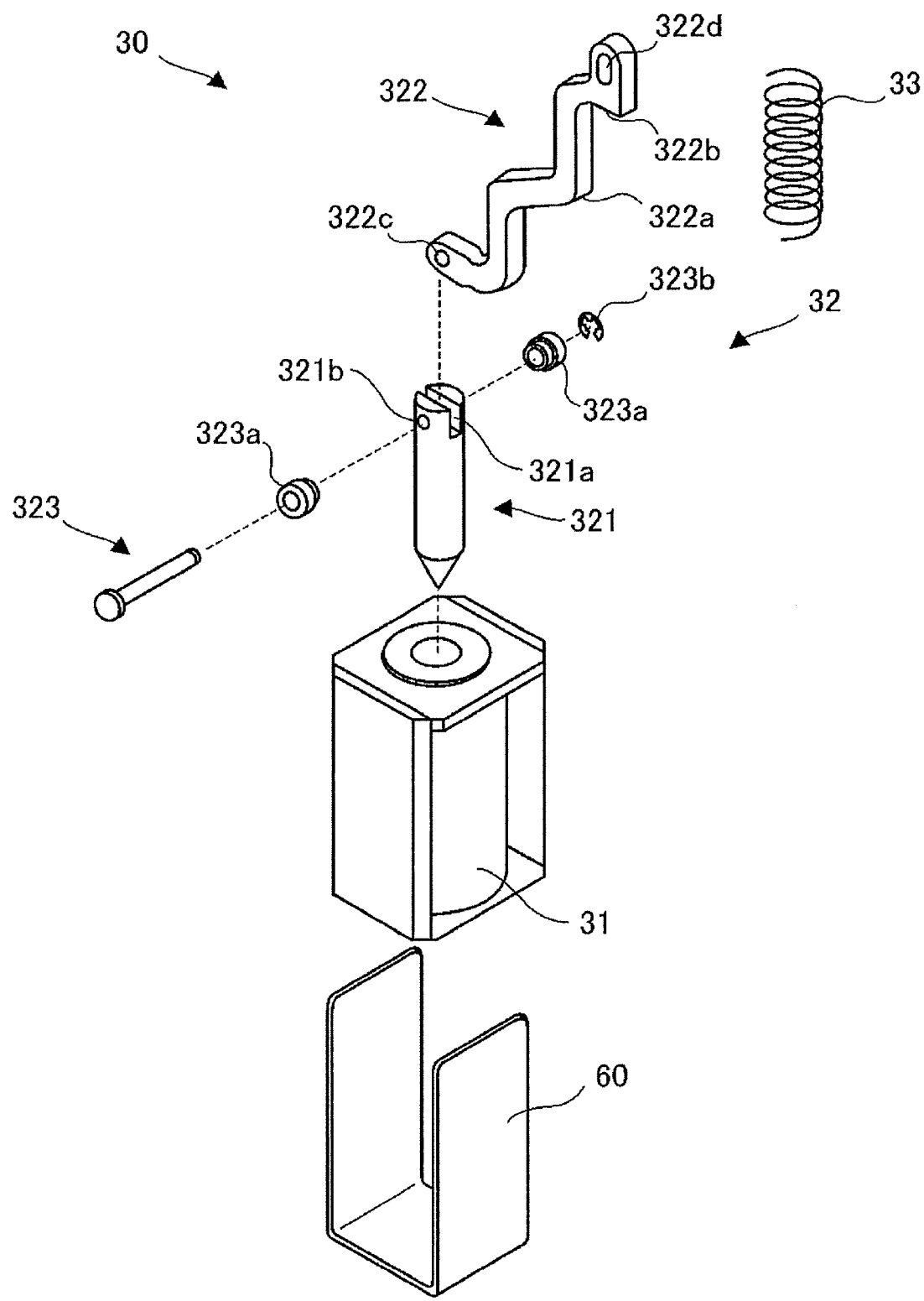
FIG. 3 is an exploded perspective view of the stopping apparatus shown in FIG. 1.
Figure 4:
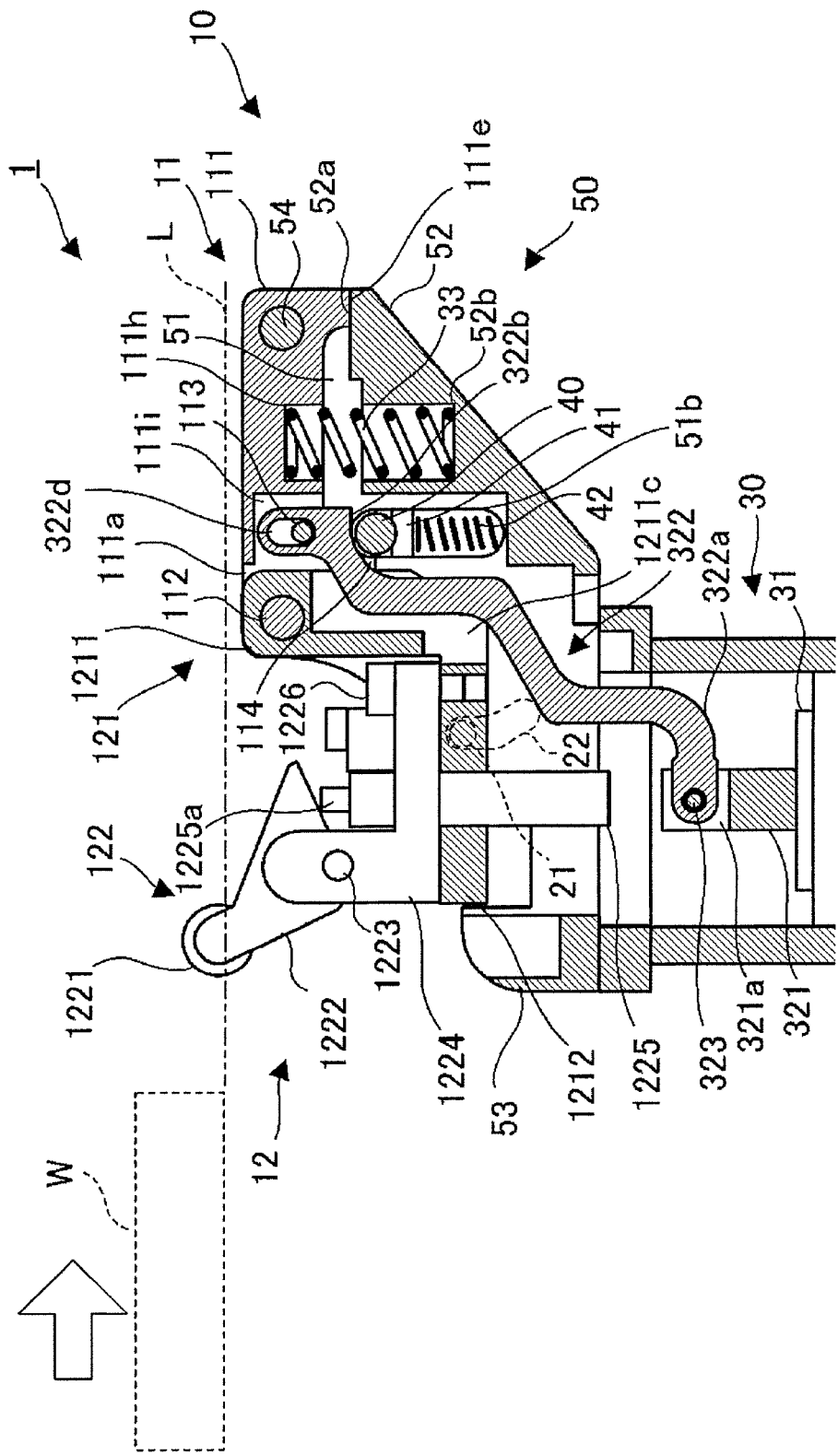
FIG. 4 is a sectional view showing the main part along the line X-X in FIG. 1.
Figure 5:
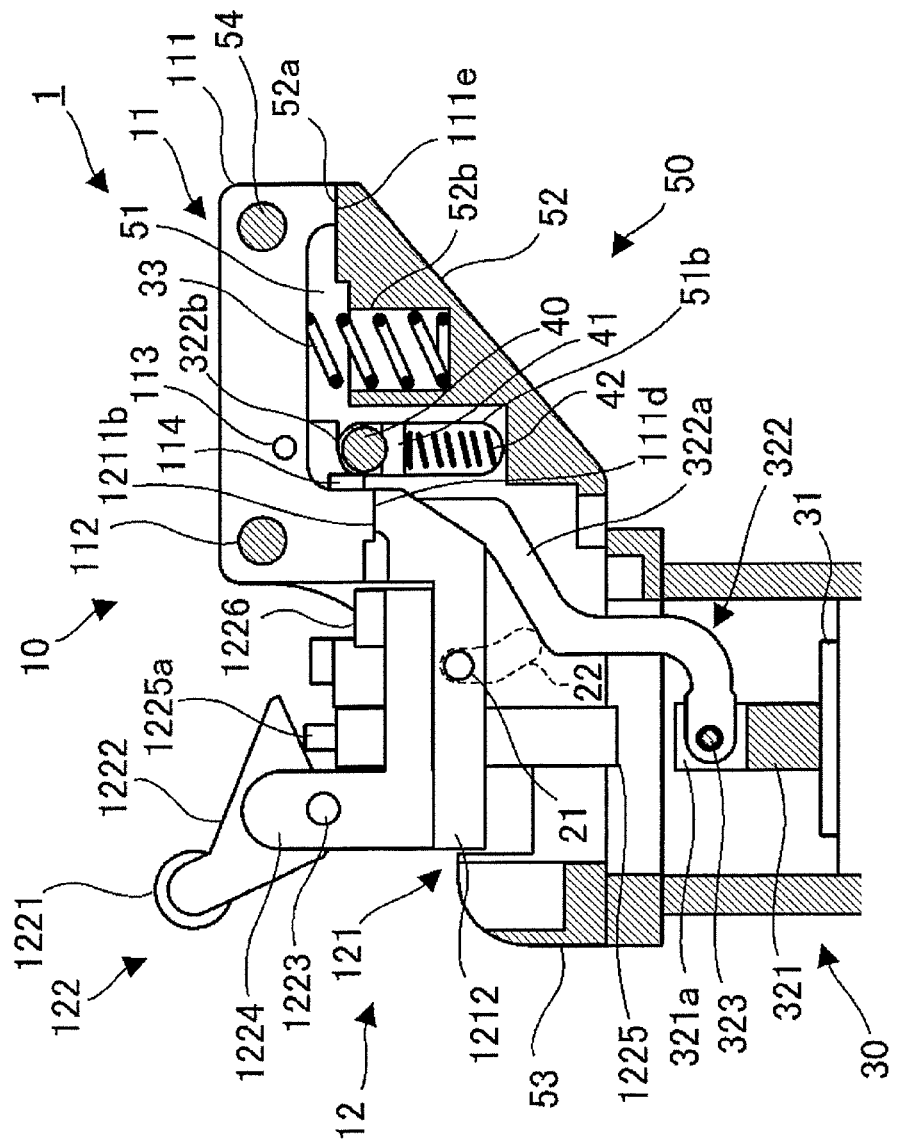
FIG. 5 is a view showing a swing unit and a connecting portion as an outer view in FIG. 4.

A stopping apparatus 1 according to an embodiment of the present invention will be described with reference to FIGS. 1 to 5. FIG. 1 is a perspective view of the stopping apparatus 1. FIGS. 2 and 3 are exploded perspective views of the stopping apparatuses 1. FIG. 4 is a sectional view showing the main part along the line X-X in FIG. 1. FIG. 5 is a view showing the outer appearance of a swing unit 10 and a connecting portion 322 in FIG. 4.

The stopping apparatus 1 is an apparatus which abuts against a work W being conveyed to stop conveyance of the work. The stopping apparatus 1 includes the swing unit 10, a regulating mechanism 20, a driving unit 30, and a support member 50 as the main components. The stopping apparatus 1 is arranged in a conveying apparatus such as a roller conveyor and used to temporarily stop the work being conveyed on the conveying apparatus. An alternate long and two short-dashed line L in FIG. 4 indicates a convey surface. The convey surface is a position (height) at which the work is placed and conveyed in a conveying apparatus (not shown).

Swing Unit 10

The swing unit 10 includes a swing portion 11 and a movable portion 12 and is pivotable about a pivot shaft 54.

The swing portion 11 includes a swing member 111 extending in the horizontal direction. The swing member 111 has a shaft hole 111b at its one end portion. A pivot shaft 54 is inserted into the shaft hole 111b and the swing portion 11 is pivotable about the pivot shaft 54. The swing member 111 includes shaft holes 111c and a groove 111a at its other end portion. A movable member 121 and a vertical portion 1211 (to be described later) are inserted into the groove 111a.

A pivot shaft 112 is inserted into the shaft holes 111c and a shaft hole 1211a of the vertical portion 1211. The movable portion 12 is connected to the swing portion 11 through the pivot shaft 112 to be pivotable about the pivot shaft 112. The pivot shaft 54 is parallel to the pivot shaft 112. As shown in FIG. 4, the pivot shaft 112 is located on the upstream side of the pivot shaft 54 in the convey direction (a direction indicated by an arrow) of the work W. The pivot shafts 54 and 112 are located below the convey surface L.

The pivot member 111 includes a downwardly protruding regulating portion 111e at its one end portion and a downwardly protruding regulating portion 111d at its other end portion. The swing member 111 includes bottomed opening portions 111h and 111i open to the lower surface of the swing member 111. The opening portion 111h serves as a spring seat hole in which an elastic member 33 (to be described later) is mounted.

The opening portion 111i communicates with the groove 111a and serves as a hole which receives the upper end portion of the connecting portion 322 (to be described later). A pin insertion hole 111f is formed to extend through the side surfaces of the swing member 111. This pin insertion hole 111f communicates with the opening portion 111i and receives a connecting pin 113.

Two mounting holes 111g are formed in the inner side surface of the regulating portion 111d to be spaced apart in the widthwise direction of the swing member 111. Abutment members 114 (to be described later) are fixed in the mounting holes 111g, respectively. The abutment members 114 abut against a pivot regulating member 40 (to be described later). Note that in this embodiment, although the swing member 111 and the abutment members 114 are separate members, but may be integrally formed.

The movable portion 12 includes the movable member 121 and an abutment unit 122. The movable member 121 is an L-shaped integral member including a vertical portion 1211 extending in the vertical direction and a horizontal portion 1212 bent from the vertical portion 1211 and extending in the horizontal direction. The movable member 121 and the abutment unit 122 are fixed to each other, as will be described later.

The upper portion of the vertical portion 1211 has a width smaller than its lower portion and is inserted into the groove 111a of the swing member 111. The upper portion of the vertical portion 1211 has the shaft hole 1211a which receives the pivot shaft 112. Regulating portions 1211b are formed at two sides of the lower portion of the vertical portion 1211.

The regulating portion 1211b of the vertical portion 1211 and the regulating portion 111d of the swing member 111 abut against each other to regulate the pivot range of the movable portion 12 with respect to the swing portion 11, as shown in FIG. 5. In this embodiment, these regulating portions regulate not to rotate the movable portion 12 about the pivot shaft 112 counterclockwise over a position indicated in FIG. 5 with respect to the swing portion 11. In this embodiment, the movable portion 12 pivots about the pivot shaft 112 with respect to the swing portion 11 upon pivoting motion of the swing unit 10 about the pivot shaft 54, as will be described later. In this case, the regulating portion 1211b and a regulating portion 111d regulate not to make the movable portion 12 pivot toward the inner side (counterclockwise direction) more than the right side surface (a surface on which the abutment member 114 is mounted) of the regulating portion 111d. This makes it possible to prevent the movable portion 12 from pivoting in a direction opposite to the intended direction. At the same time, the interference with the driving unit 30, the pivot regulating member 40, and the like can be prevented, and the movement of the movable portion 12 by the regulating mechanism 20 can be assisted.

A groove 1211c is formed in the vertical portion 1211. This groove 1211c is formed to prevent the interference between the connecting portion 322 (to be described later) and the movable member 121.

The abutment unit 122 is mounted on the horizontal portion 1212. A through hole 1212a and a screw hole 1212b are formed to extend through the horizontal portion 1212. A pin insertion hole 1212c is formed in one side surface of the horizontal portion 1212 and open to this side surface.

The abutment unit 122 includes a roller 1221 serving as a work abutment portion which abuts against the work, a movable member 1222 which rotatably supports the roller 1221, and a support member 1224 placed on the upper surface of the horizontal portion 1212. The movable member 1222 is supported by the support member 1224 to pivot about a shaft 1223.

The cylinder portion (outer cylinder) of a shock absorber 1225 is inserted into the insertion hole (not shown) formed to vertically extend through the support member 1224. The shock absorber 1225 is fixed to the support member 1224 in a state in which a rod portion 1225a protrudes above the upper surface of the support member 1224.

The lower surface of the rear end portion of the movable member 1222 abuts against the distal end of the rod portion 1225a of the shock absorber 1225. A portion of the cylinder portion of the shock absorber 1225 which extends from the lower surface of the support member 1224 extends through the through hole 1212a.

A bolt 1226 is screwed into the screw hole 1212b to fix the support member 1224 to the horizontal portion 1212, thereby fixing the abutment unit 122 to the movable member 121.

Support Member 50

The support member 50 has an integral structure including a pair of L-shaped wall portions 51, a connecting portion 52 which connects the vertical portions (the lower right side portions in FIG. 2, and left side portions in FIG. 4) of the wall portions 51, and a connecting portion 53 which connects the horizontal portions (the upper left side portions in FIG. 2 and the left side portions in FIG. 4) of the wall portions 51. The support member 50 has a frame-like shape which is open vertically.

The wall portions 51 respectively include bearing holes 51a which support the pivot shaft 54. The swing member 111 is fitted between the wall portions 51, and the bearing holes 51a are aligned with the shaft hole 111b. The pivot shaft 54 is inserted into these holes. Finally, stop rings 54a are engaged with the two end portions of the pivot shaft 54. In this manner, the support member 50 and the swing member 111 are assembled and engaged with each other. Therefore, the entire swing unit 10 is supported by the support member 50 to pivot about the pivot shaft 54.

The wall portions 51 respectively have grooves 51b which receive the pivot regulating member 40. Each groove 51b has an oval shape extending in the vertical direction (parallel to the moving direction of a plunger 321 (to be described later)) and extends through the corresponding wall portion 51 in the direction of thickness. The pivot regulating member 40 has a pin-like shape and is bridged between and engaged with the grooves 51b. The pivot regulating member 40 is vertically movable along the grooves 51b. Stop rings 40a are mounted on the end portions of the pivot regulating member 40 to prevent the pivot regulating member 40 from removal.

Receiving members 41 which support the two end portions of the pivot regulating member 40 upward and elastic members 42 disposed between the receiving members 41 and the bottom portions of the grooves 51b are disposed in the grooves 51b, respectively.

Each receiving member 41 is interposed between the pivot regulating member 40 and the corresponding elastic member 42 to stably transmit the biasing force of the corresponding elastic member 42 to the pivot regulating member 40. In this embodiment, each elastic member 42 comprises a compression spring (coil spring) which always biases the pivot regulating member 40 through the corresponding receiving member 41 upward. The biasing force is smaller than that of the elastic member 33. Note that the elastic member 42 is not limited to the coil spring, but may be any elastic member in addition to any other compression spring such as a leaf spring. A hole 51c is formed in the bottom portion of each groove 51b, and the lower end portion of the corresponding elastic member 42 is inserted into this hole 51c to stably support the elastic member 42.

A portion near each bearing hole 51a in the connecting portion 52 has a horizontal surface to form a pivot regulating surface 52a. When the regulating portion 111e of the swing member 111 abuts against the pivot regulating surface 52a to prevent the swing unit 10 (swing member 111) from pivoting clockwise from the state in FIG. 4 or 5. A blind hole 52b is formed in the intermediate portion between the bearing hole 51a and the groove 51b in the connecting portion 52. This hole 52b is a spring seat hole into which the elastic member 33 (to be described later) is inserted and loaded.

Regulating Mechanism 20

The regulating mechanism 20 is a mechanism which regulates a moving range so as to guide the pivoting motion of the movable portion 12 about the pivot shaft 112. Providing the regulating mechanism 20 makes it possible to move the movable portion 12 along an intended locus when pivoting the swing unit 10 about the pivot shaft 54.

In this embodiment, the regulating mechanism 20 includes a pin 21 and a guide groove 22. The pin 21 is inserted into the pin insertion hole 1212c of the movable member 121 to form a portion protruding from the side surface portion of the movable member 121. The guide groove 22 is formed in one of the pair of wall portions 51.

The end portion of the pin 21 is engaged with the guide groove 22 to allow the guide groove 22 to guide the movable portion 12. Note that in this embodiment, the pin 21 serves as an engaging portion on the movable portion 12 side, while the guide groove 22 serves as an immobile engaging portion on the wall portion 51 side. The layout positions of the pin and the guide groove may be reversed. In this embodiment, the guide groove 22 and the groove 51b can be formed using the common support member 50. This is advantageous in forming the guide groove 22 and the groove 51b in terms of their positional accuracy.

The upper portion of the guide groove 22 extends vertically, and its lower portion extends obliquely downward on the downstream portion of the convey direction. In other words, the guide groove 22 is formed in a V shape moderately bending toward the downstream side of the convey direction. For this reason, when the swing portion 11 of the swing unit 10 is pivoted counterclockwise about the pivot shaft 54 from the state in FIG. 4 or 5, the movable portion 12 moves downward almost straight in its initial state. After that, the movable portion 12 moves downward on the downstream side of the convey direction. The moving direction of the movable portion 12 is determined by the groove shape (bending shape) of the guide groove 22.

Driving Unit 30

The driving unit 30 drives the swing unit 10 to pivot about the pivot shaft 54. The driving unit 30 includes the elastic member 33. In this embodiment, the elastic member 33 comprises a push spring (coil spring) and is loaded between the opening portion 111h of the swing member 111 and the hole 52b of the connecting portion 52. The elastic member 33 always biases the swing unit 10 upward to maintain the state of FIG. 4 or 5 (the state in which the regulating portion 111e abuts against the pivot regulating surface 52a to regulate pivoting motion of the swing member 111). Note that the elastic member 33 need not be limited to the coil spring, and any other elastic member can be used in addition to any other compression spring such as a leaf spring.

The driving unit 30 further includes an electrically driven driving portion 31 surrounded by a case 60 and a movable portion 32 moved by the driving portion 31. The movable portion 32 includes a plunger 321, a connecting portion 322 which connects the plunger 321 and the swing unit 10, and a connecting pin 323.

In this embodiment, the driving portion 31 and the plunger 321 constitute a pull solenoid. Upon energization of the cylindrical driving portion 31 (electromagnet), a driving force acts in only the direction (downward) in which the plunger 321 is drawn into the cylinder of the driving portion 31. That is, the pull solenoid does not generate a driving force in a direction (upward) to pull out the plunger 321 from the cylinder of the driving portion 31. In this embodiment, the pull solenoid is employed, but any other electrically driven actuator such as a motor may be used. Note the same effect as described above can be obtained even if a known actuator except an electrically driven actuator (for example, an air cylinder) may be used in place of the electrically driven actuator. Use of the pull solenoid can make it possible to obtain a compact apparatus.

A slit (recessed portion) 321a is formed at the upper end portion of the plunger 321 to engage with and receive one end portion (lower end portion) of the connecting portion 322. A pin insertion hole 321b extending through the plunger 321 radially (a direction perpendicular to the slit 321a) is formed in the peripheral surface of the upper end portion of the plunger 321.

The connecting portion 322 includes a main body 322a. A circular connecting hole 322c is formed in the lower portion of the main body 322a to receive the connecting pin 323. The connecting portion 322 is inserted into the slit 321a, the pin insertion hole 321b and the connecting hole 322c are aligned, and the connecting pin 323 is inserted into these holes. Therefore, the plunger 321 engages with the connecting portion 322. Note that a stop ring 323b engages with the end portion of the connecting pin 323 to prevent the connecting pin 323 from removal. Members 323a are spacers, respectively.

The connecting portion 322 is thus connected to the plunger 321 to pivot about the connecting pin 323. Note that in this embodiment, the main body 322a is bent in multiple stages so as not to interfere with the structure around the main body 322a while making the stopping apparatus 1 compact. However, the shape of the main body 322a can be set arbitrarily. If the main body 322a does not interfere with its surrounding structure, the main body 322a may be made straight.

A connecting hole 322d is formed in the upper portion of the main body 322a to receive the connecting pin 113 serving as a shaft member. The connecting hole 322d is a hole elongated in the vertical direction. The upper end portion of the connecting portion 322 is inserted into the opening portion 111i of the swing member 111. The connecting pin 113 is inserted into the pin insertion hole 111f of the swing member 111 and the connecting hole 322d, thereby engaging the connecting portion 322 with the swing member 111. Since the connecting hole 322d is an elongated hole, the connecting portion 322 and the swing member 111 are fitted with a predetermined play (loosely fitted).

An abutment portion 322b is formed below the connecting hole 322d. The abutment portion 322b abuts against the uppermost portion of the peripheral surface of the pivot regulating member 40 and engages with the pivot regulating member 40.

In this embodiment, the connecting portion 322 is connected to the electrically driven unit 30 relatively on the upstream side of the convey direction and is connected to the swing member 111 relatively on the downstream side of the convey direction. With this connecting structure, there is implemented a structure in which the electrically driven unit 30 is located below the roller 1221 abutting against the work. As a result, there can be provided a pivot type stopping apparatus while locating the driving source at the same position as the conventional stopping apparatus of a type in which the abutment portion abutting the work is reciprocally moved along a straight line.

Operation Example of Stopping Apparatus 1

Figure 6:
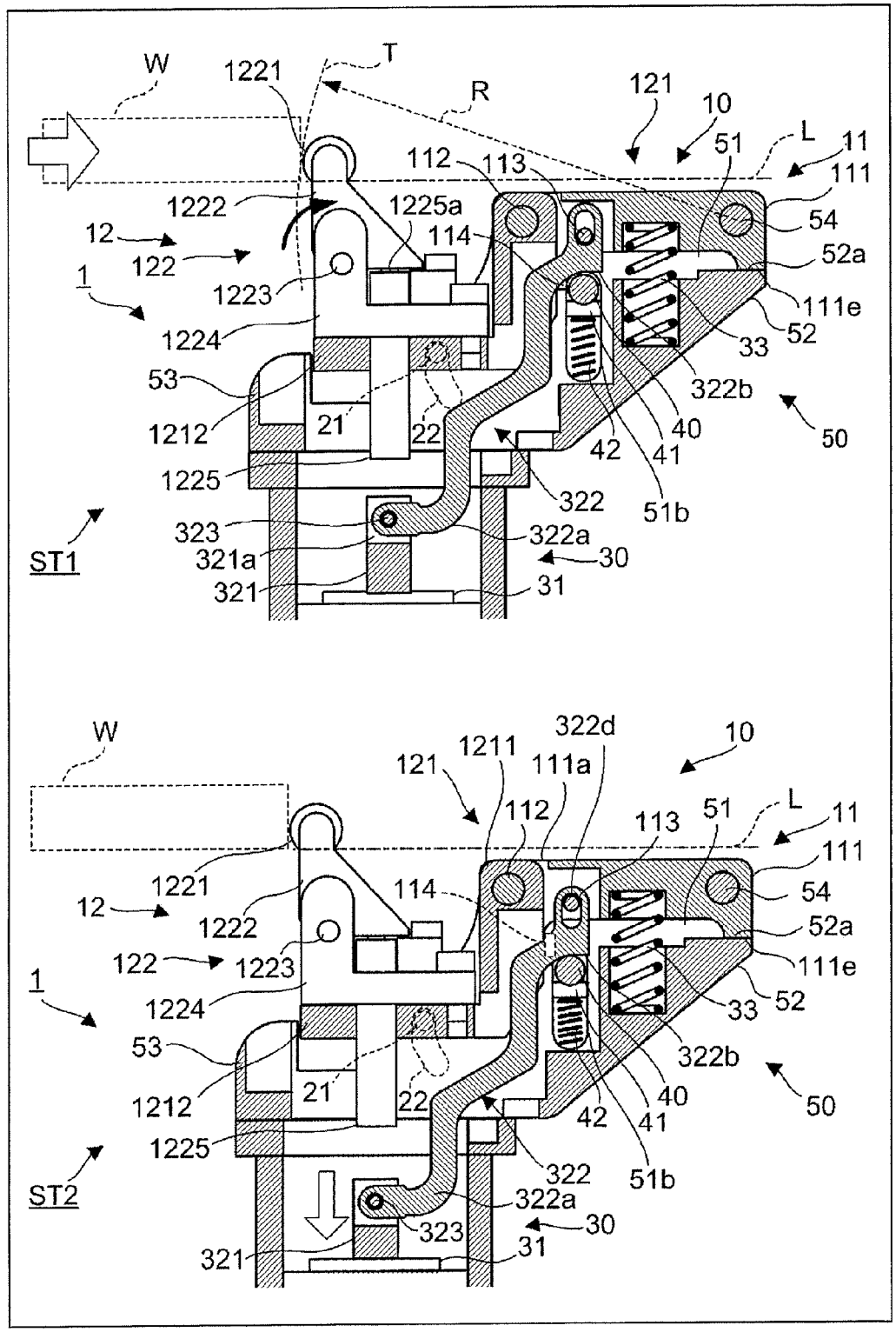
FIG. 6 is a view for explaining the operation of the stopping apparatus shown in FIG. 1.
Figure 7:
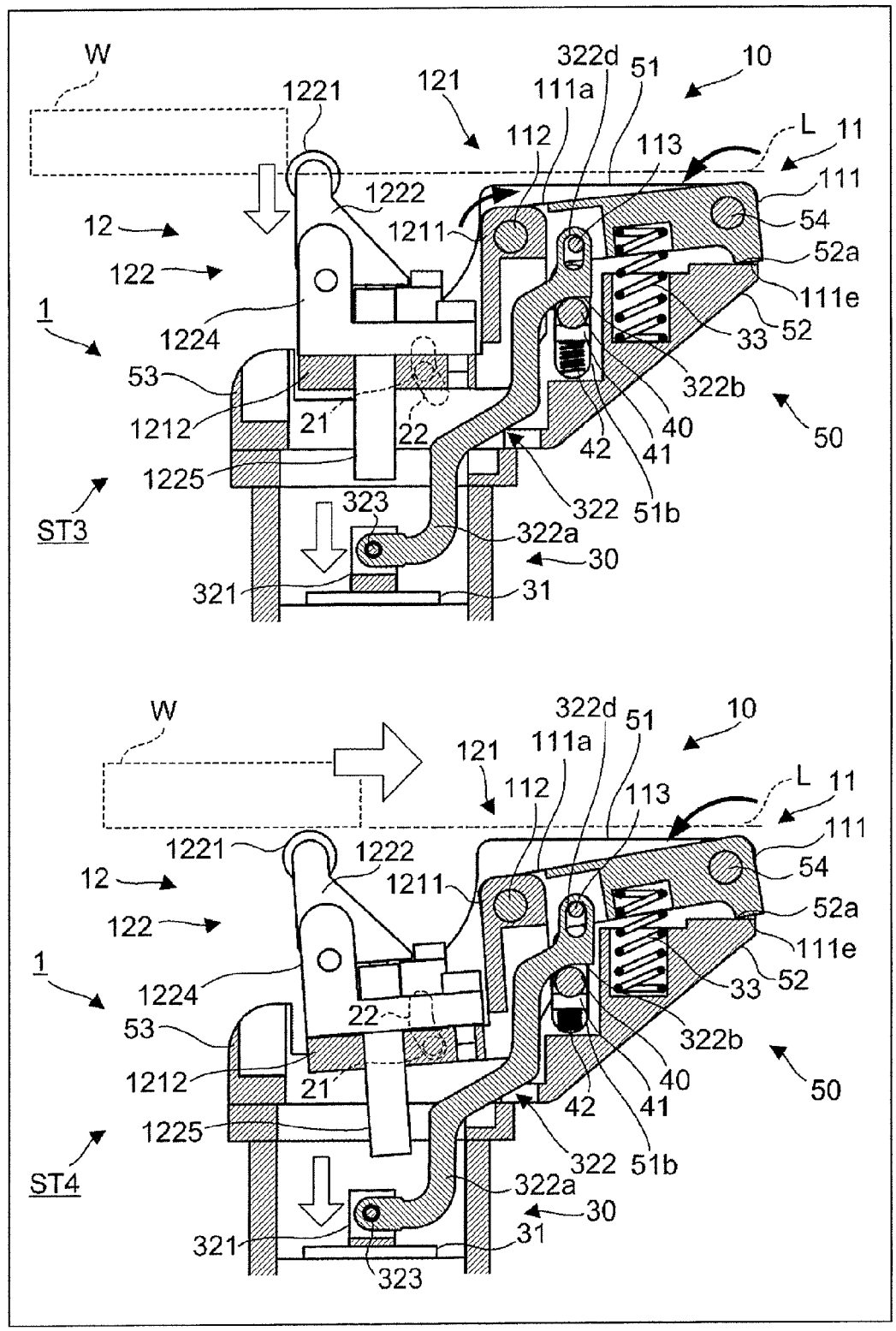
FIG. 7 is a view for explaining the operation of the stopping apparatus shown in FIG. 1.

An operation example of the stopping apparatus 1 will now be described with reference to FIGS. 4, 6, and 7. FIGS. 6 and 7 are views for explaining the operation of the stopping apparatus 1.

FIG. 4 shows a state immediately before the work W conveyed from the left to the right in the horizontal direction is stopped. The swing unit 10 of the stopping apparatus 1 is located at the abutment position where the roller 1221 abuts against the work W. At this abutment position, the roller 1221 extends upward from the lower surface of the work W, that is, the convey surface L.

The elastic member 33 applies the biasing force in a direction where the swing unit 10 is located at the abutment position (that is, the direction is upward in FIG. 4, defines the horizontal state of the swing member 111 as the upper limit, and is a counterclockwise direction pivotable about the pivot shaft 54). Note that as described above, since the pivot regulating surface 52a of the connecting portion 52 abuts against the regulating portion 111e of the swing member 111, the swing unit 10 does not further pivot clockwise from the state in FIG. 4.

In the state of FIG. 4, the driving portion 31 is set in the non-driving state. The pivot regulating member 40 is located at the upper end of the groove 51b by the biasing force of the elastic member 42. The pivot regulating member 40 abuts against the abutment portion 322b of the connecting portion 322 and is set in the engaging state. Since the driving portion 31 is set in the non-driving state, the connecting portion 322 and the plunger 321 are pushed up to the uppermost positions through the pivot regulating member 40 by the biasing force of the elastic member 42. The connecting pin 113 is located at the lowermost position of the connecting hole 322d. As described above, the elastic member 42 applies the biasing force in a direction in which the pivot regulating member 40 is engaged with the connecting portion 322.

A state ST1 in FIG. 6 indicates a state in which the work W abuts against the roller 1221 to stop the work W at a predetermined stop position. In this embodiment, the movable member 1222 which supports the roller 1221 is pivotable about the shaft 1223. For this reason, in a stage in which the work W starts abutting against the roller 1221, the convey force of the work W does not act in a direction in which the entire swing unit 10 pivots. Only the movable member 1222 pivots clockwise to set the state ST1. Upon pivoting motion of the movable member 1222, the movable member 1222 starts abutting against the distal end of the rod portion 1225a of the shock absorber 1225. The shock absorber 1225 can buffer the impact of collision between the work W and the roller 1221.

In the state ST1, the convey force of the work W acts in a direction in which the movable portion 12 pivots clockwise about the pivot shaft 112 and a force acts on the swing portion 11 to pivot the pivot shaft 54 counterclockwise about the pivot shaft 54. That is, a force acts to bend the movable portion 12 and the swing portion 11.

However, since the pivot regulating member 40 and the abutment member 114 of the swing member 111 abut against and engage with each other, the pivoting motion of the swing portion 11 is regulated. Since the upper end portion of the guide groove 22 and the pin 21 abut against each other, the pivoting motion of the movable portion 12 is also regulated.

In this embodiment, the pivoting motions of the swing portion 11 and movable portion 12 can be firmly and strictly regulated without using the driving force of the driving portion 31. This makes it possible to stop the work W at the predetermined stop position.

An operation (stop-canceling process) will be described below in which by driving the driving portion 31, the roller 1221 is retracted below the lower surface of the work W, the swing unit 10 is pivoted to the retracted position where the work W and the roller 1221 do not contact, and the stopping apparatus 1 can pass by the work W. In this embodiment, the driving portion 31 moves the plunger 321 in a direction in which the swing unit 10 pivots toward the retracted position against the biasing force of the elastic member 33.

In this embodiment, the pivot shaft 54 about which the swing unit 10 pivots is located on the downstream side of the stop position of the work W in the convey direction. For this reason, even if the pivot unit 10 does not have the pivot shaft 112 and the movable portion 12 does not pivot with respect to the swing portion 11, the abutment point of the roller 1221 with respect to the work W moves along an arcuate locus T described in the state ST1 of FIG. 6. The arcuate locus T is a virtual arc having, as a radius, the distance between the axis of the pivot shaft 54 and the abutment point of the roller 1221 with respect to the work W.

When the abutment point of the roller 1221 with respect to the work W moves along the arcuate locus, the roller 1221 (stopping apparatus 1) pushes back the work W slightly toward the upstream side when the roller 1221 moves from the contact position at which the work W and the roller 1221 contact each other to the position at which the work W and the roller 1221 do not contact each other. An extra output of the driving portion 31 is required by this push-back force. In this embodiment, the movable portion 12 pivots with respect to the swing portion 11, thereby solving the above problem.

A state ST2 in FIG. 6 indicates an initial state in which the driving portion 31 starts driving. The plunger 321 starts moving downward (the plunger 321 starts to be drawn by the driving portion 31). Since the pivot regulating member 40 engages with the connecting portion 322, the pivot regulating member 40 also moves downward interlockingly with the movement of the plunger 321 and the connecting portion 322.

Since the moving direction of the plunger 321 is parallel to the longitudinal direction of the groove 51b, the pivot regulating member 40 moves in a direction parallel to the moving direction of the plunger 321. When the pivot regulating member 40 moves downward up to the position of the state ST2 of FIG. 6 (a state in which the connecting pin 113 is located at the upper end of the connecting hole 322), the pivot regulating member 40 does not engage with (abut against) the abutment member 114, and the engagement is canceled. The moving range of the pivot regulating member 40 when the pivot regulating member 40 engages with the abutment member 114 is defined as a regulation region. The moving range of the pivot regulating member 40 when the pivot regulating member 40 does not engage with the abutment member 114 is defined as a non-regulation region.

As described above, the connecting hole 322d is an elongated hole, and the connecting hole 322d is loosely fitted on the connecting pin 113. The length of the elongated hole is set such that the swing member 111 and the connecting portion 322 are set in a non-connecting state until the pivot regulating member 40 falls outside the regulating region, so the driving portion 31 does not apply the pivot force to the swing unit 10. When the pivot regulating member 40 reaches the non-regulation region, the upper portion of the peripheral portion of the connecting pin 113 seats on the upper portion of the connecting hole 322d. This makes it possible to set the swing member 111 and the connecting portion 322 in the connecting state. The driving portion 31 therefore applies the pivot force to the swing unit 10.

As described above, in this embodiment, the connecting portion 322 and the swing member 111 are connected with a delay from the movement of the plunger 321 and the pivot regulating member 40. This is because a state can be prevented in which the pivot force applied from the driving portion 31 to the swing unit 10 before the pivot regulation of the swing unit 10 by the pivot regulating member 40 is canceled is wasted.

When the plunger 321 further moves downward while the swing unit 10 and the connecting portion 322 are set in the connecting state and the pivot regulating member 40 falls into the non-regulation region, the swing unit 10 pivots counterclockwise (downward) against the biasing force of the elastic member 33. As indicated by a state ST3 of FIG. 7, the abutment unit 12 starts moving downward to the retracted position. When the abutment unit 12 reaches the retracted position as indicated by a state ST4, the stop of the work can be canceled.

When pivoting the swing unit 10 to the retracted position, the movable portion 12 pivots against the swing portion 11. The intermediate portion (pivot shaft 112) of the swing unit 10 is bent. The regulating mechanism 20 guides the pivoting motion of the movable portion 12 about the pivot shaft 112. The movable portion 12 pivots clockwise (upward) with respect to the swing portion 11. As a result, the distance between the pivot shaft 54 and the roller 1221 becomes short along with the pivoting motion of the swing unit 10 from the abutment position to the retracted position. The abutment point between the roller 1221 and the work W moves inside the arcuate locus T in FIG. 6.

An operation from the state ST3 to the state ST4 will be further described below. When the swing portion 11 starts rotating counterclockwise about the pivot shaft 54, the pivot shaft 112 and the swing portion 11 move together.

The upper portion of the guide groove 22 extends in the vertical direction, and movement of the movable member 121 to the right in FIG. 7 is regulated through the pin 21. For this reason, the movable member 121 moves downward along the guide groove 22 and rotates clockwise about the pin 21.

As a result, the roller 1221 moves downward while moving clockwise. That is, the roller 1221 moves to the downstream side of the convey direction, that is, downward (lower right direction in FIG. 7).

Note that an upward moving distance upon clockwise movement of the roller 1221 may be temporarily larger than a downward moving distance of the movable member 121 depending on the length of the swing member 111 of the swing portion 11, the distance between the pivot shaft 112 and the pin 21, the distance between the roller 1221 and the pin 21, and the like.

However, in this case, the roller 1221 continuously moves downward in the convey direction. For this reason, the abutment point between the roller 1221 and the work W moves inside the arcuate locus T. The distance between the pivot shaft 54 and the abutment point between the roller 1221 and the work W becomes short.

The lower portion of the guide groove 22 extends obliquely toward the downstream side of the convey direction. This makes it possible to guide the movable member 121 toward the downstream side of the convey direction through the pin 21. For this reason, downward movement toward the downstream side of the convey direction of the roller 1221 is further promoted. A combination of two movements (that is, guide (horizontal movement) toward the downstream side of the convey direction and the downward movement) makes it possible to more smoothly move the roller 1221 to the retracted position.

As described above, in this embodiment, when pivoting the swing unit 10 from the abutment position to the retracted position, the movable portion 12 moves downward almost straight, and after that, moves downward toward the downstream side of the convey direction. The movable portion 12 does not move in a direction to push back the work W toward the upstream side. That is, when pivoting the movable portion 12 from the abutment position to the retracted position, a force for pushing back the work W toward the upstream side need not be considered for the pivot force.

For this reason, a lower-output driving portion 31 actuator can be employed as the actuator (driving portion 31) of the stopping apparatus 1.

The shape of the guide groove 22 is arbitrary as long as the abutment point between the roller 1221 and the work W moves inside the arcuate locus T and the roller 1221 can be moved so that the distance between the pivot shaft 54 and the abutment point becomes short.

In this embodiment, with respect to the pivot shaft 54, the position (connecting pin 113) at which the connecting portion 322 and the swing portion 11 are connected is spaced apart from the action position (opening portion 111*h*) at which the elastic member 33 applies the biasing force to the swing portion 11. For this reason, as compared with a case in which the position of the connecting pin 113 is located nearer to the pivot shaft 54 than the action position, a lower-output driving portion can be used as the driving portion 31 due to the principle of leverage.

When the driving portion 31 is set in the non-driving state from the state ST4 in FIG. 7, the swing portion 11 and the movable portion 12 return to the state in FIG. 4 due to the restoration force of the elastic member 33 and the elastic member 42. Note that when the driving portion 31 is set in the non-driving state in a state in which the roller 1221 abuts against the bottom surface of the work W whose conveyance is restarted, the swing portion 11 and the movable portion 12 return to the state in FIG. 4 due to the restoration force of the elastic member 33 and the elastic member 42 after the work W has passed (the abutment unit 122 also returns to the original state).

In this embodiment, when the pivot regulating member 40 moves interlockingly with the movement of the movable portion 32, the accidental pivoting motion of the swing unit 10 from the abutment position can be prevented, the swing unit 10 can be moved to the retracted position, and necessary functions for the stopping apparatus can be implemented while employing the driving portion 31 for generating the driving force in a single direction.

Second Embodiment

Figure 8:
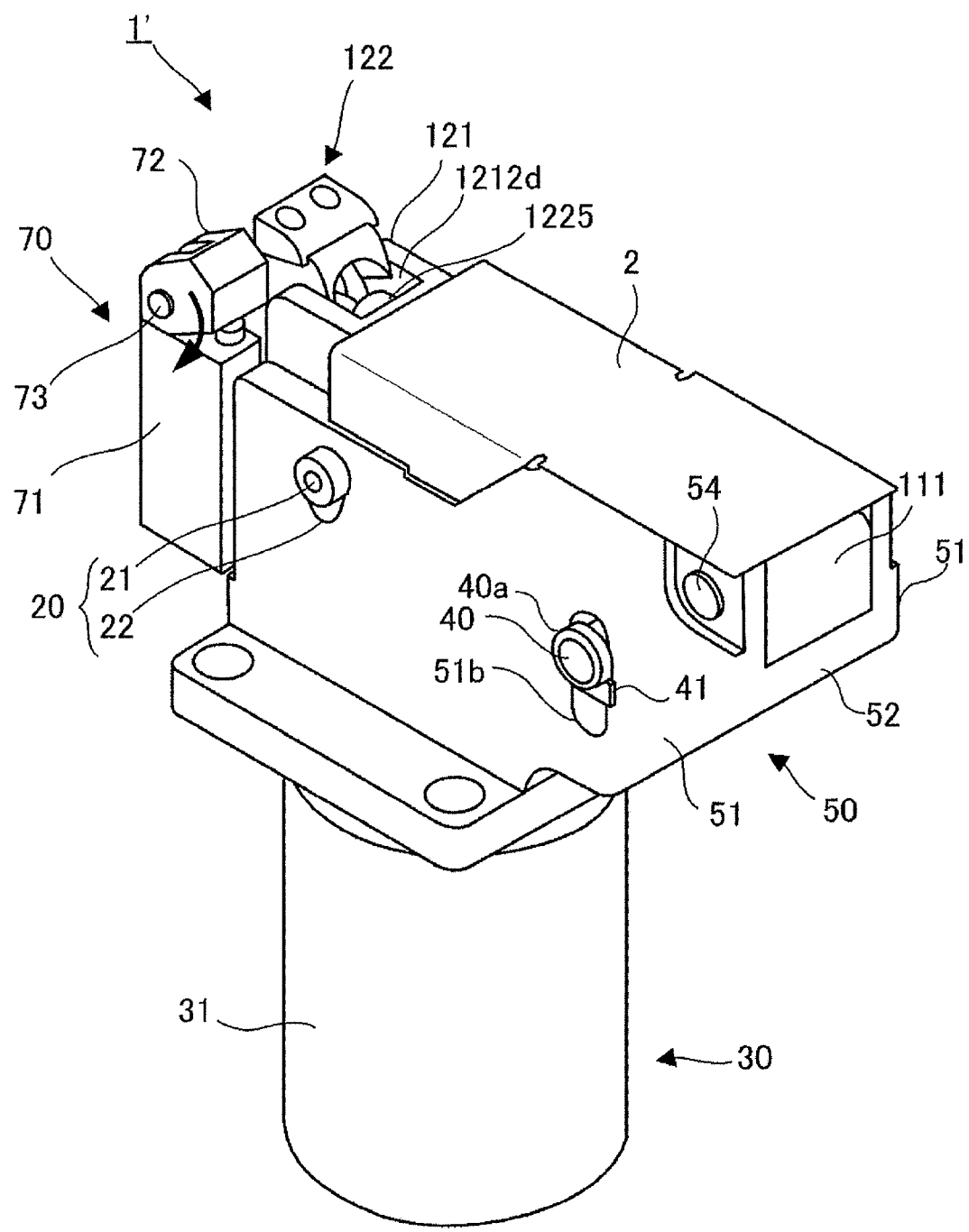
FIG. 8 is a perspective view of a stopping apparatus according to another embodiment of the present invention.
Figure 9:
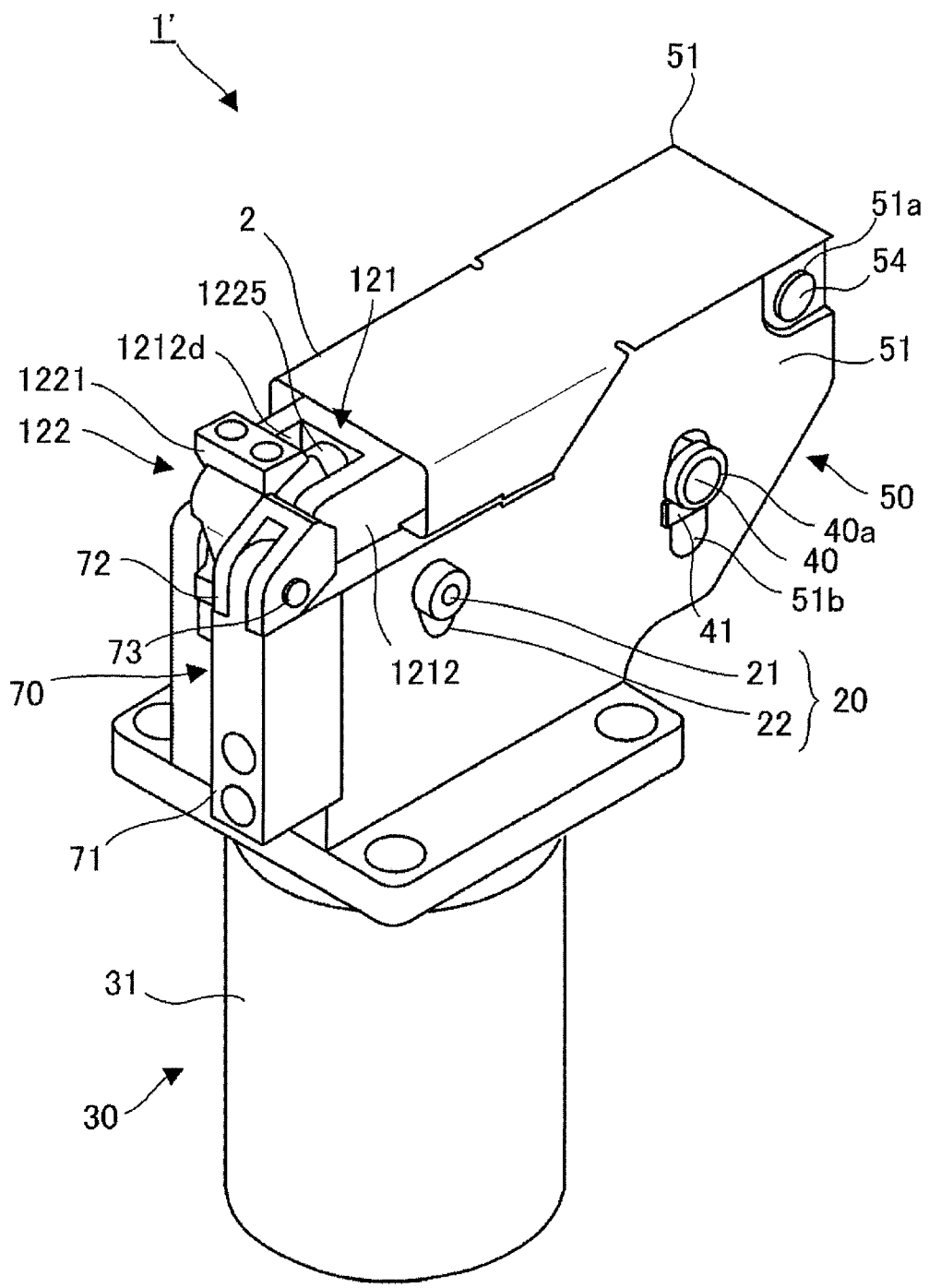
FIG. 9 is a perspective view of the stopping apparatus shown in FIG. 8 when viewed from another direction.
Figure 10:
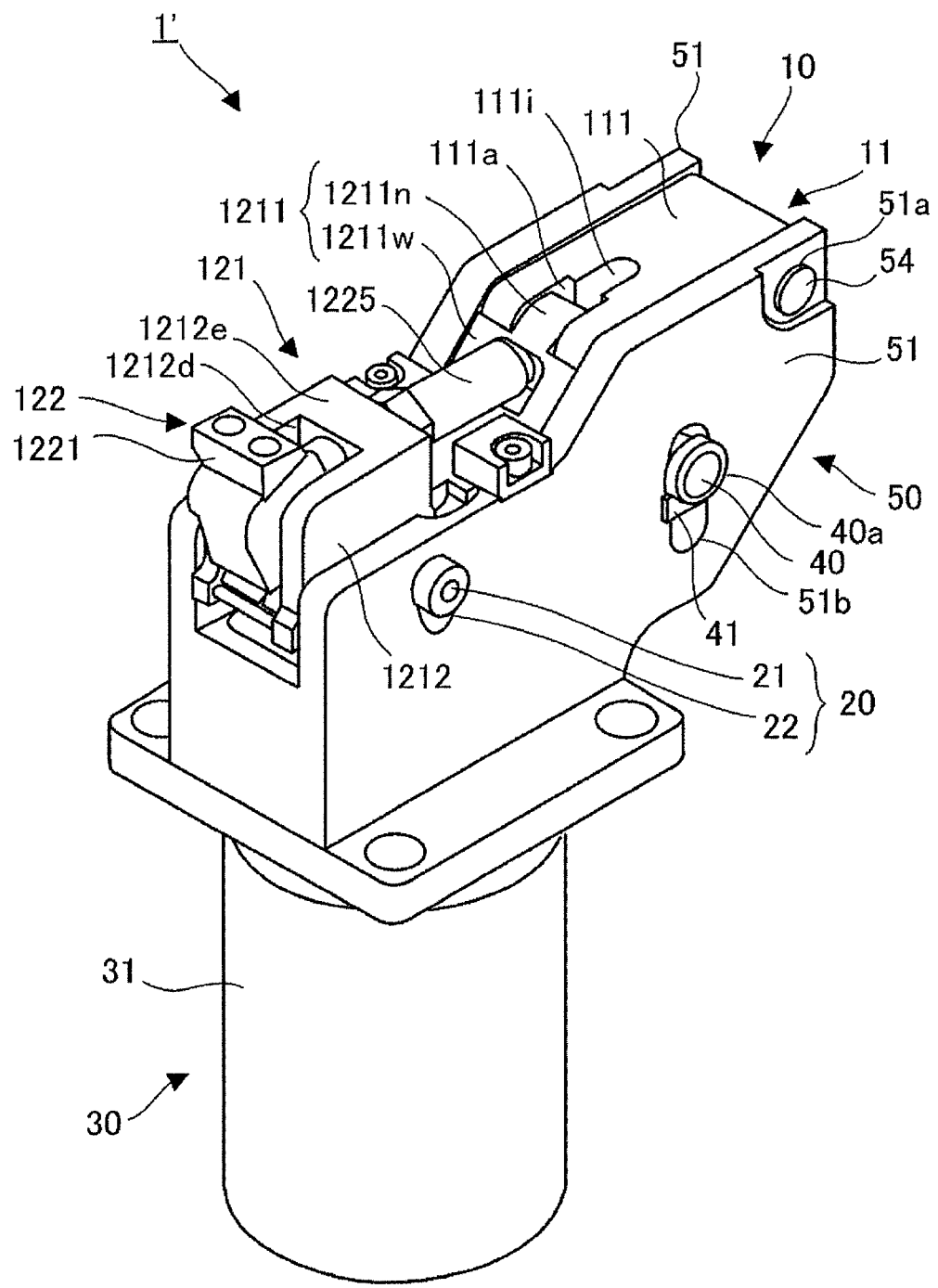
FIG. 10 is a perspective view showing a state in which a cover and the like of the stopping apparatus shown in FIG. 8 are removed.
Figure 11:
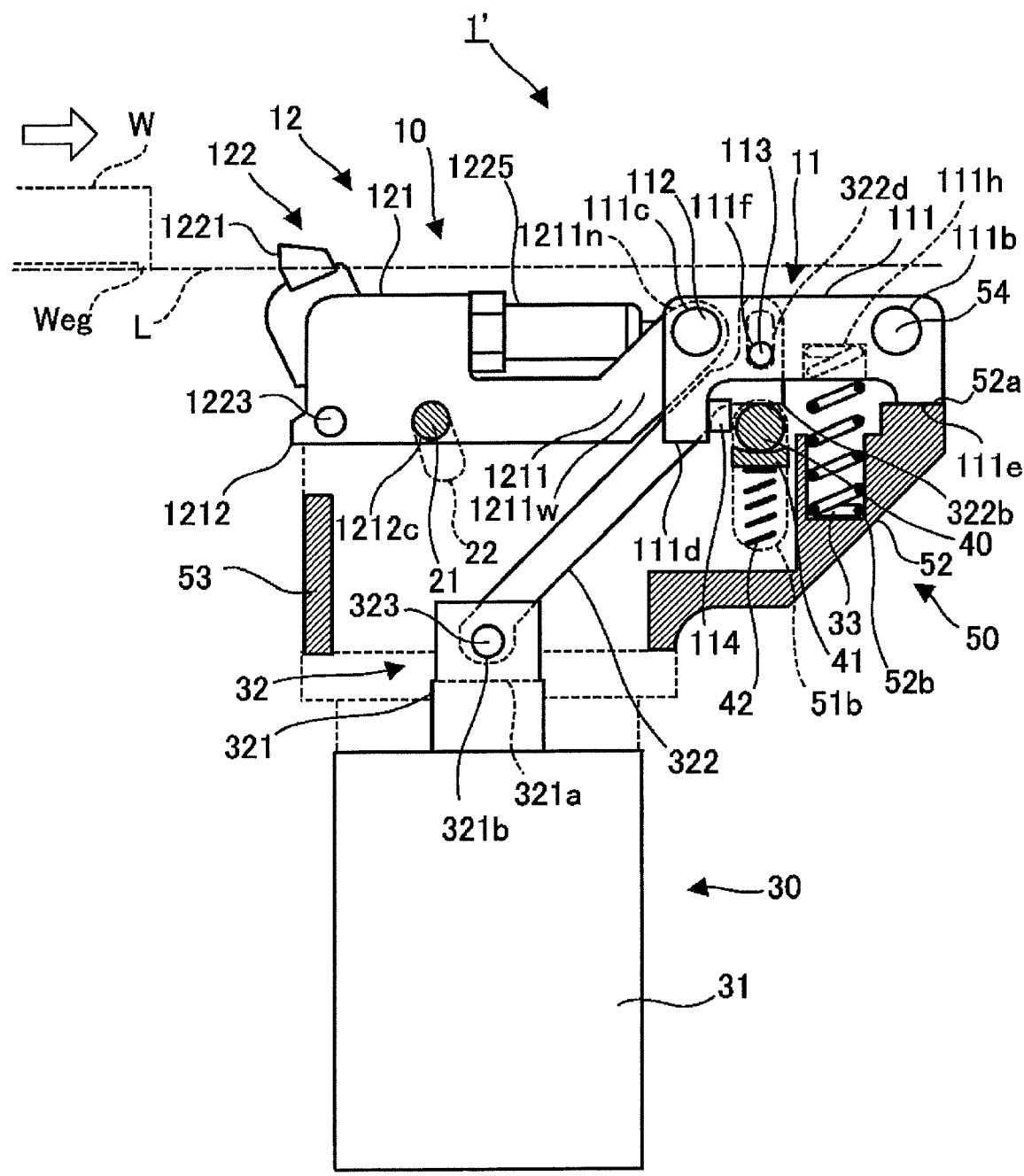
FIG. 11 is a view for explaining the internal structure of the stopping apparatus shown in FIG. 8.

A stopping apparatus 1' according to another embodiment of the present invention will be described with reference to FIGS. 8 to 11. FIG. 8 is a perspective view of the stopping apparatus 1', FIG. 9 is a perspective view when the stopping apparatus 1' is viewed from another direction. FIG. 10 is a perspective view in which a cover member 2, a reverse feed preventing apparatus 70, and the like of the stopping apparatus 1' are removed. FIG. 11 is a view for explaining the internal structure of the stopping apparatus 1'.

The stopping apparatus 1' is a modification of the stopping apparatus 1. The layout of a shock absorber 1225 and the structures of a swing member 111 and a movable member 121 are different from those of the stopping apparatus 1. In the following description, for the sake of descriptive simplicity, the structures having the same functions as those of the stopping apparatus 1 denote the same reference numerals in the structure of the stopping apparatus 1'.

The stopping apparatus 1' is an apparatus which abuts against a work W being conveyed to stop conveyance of the work. The stopping apparatus 1' mainly includes a swing unit 10, a regulating mechanism 20, a driving unit 30, and a support member 50. For example, the stopping apparatus 1' is arranged in a convey apparatus such as a roller conveyor and is used to temporarily stop the work being conveyed on the convey apparatus. Referring to FIG. 11, an alternate long and two short-dashed line L indicates a convey surface. The convey surface has a position (height) at which the work is placed and conveyed on the convey apparatus (not shown).

Swing Unit 10

The swing unit 10 includes a swing portion 11 and a movable portion 12 and is pivotable about a pivot shaft 54.

The swing portion 11 includes a swing member 111 extending in the horizontal direction. The swing member 111 includes a shaft hole 111*b* at its one end portion. The pivot shaft 54 is inserted into the shaft hole 111*b* so that the swing member 11 is pivotable about the pivot shaft 54. The swing member 111 includes a shaft hole 111*c* and a groove 111*a* at its other end portion. A connecting portion 1211 of the movable member 121 (to be described later) is inserted into the groove 111*a*.

A pivot shaft 112 is inserted into the shaft hole 111*c* and a shaft hole (not shown) of the connecting portion 1211. The movable portion 12 is connected to the swing portion 11 through the pivot shaft 112 and is pivotable about the pivot shaft 112. The pivot shaft 54 and the pivot shaft 112 are parallel to each other. As shown in FIG. 11, the pivot shaft 112 is located on the upstream side of the pivot shaft 54 in the convey direction (a direction indicated by an arrow in FIG. 11) of the work W, and the pivot shafts 54 and 112 are located below the convey surface L.

The swing member 111 includes a downwardly protruding regulating portion 111*e* at its one end portion and a downwardly protruding portion 111*d* at its other end portion. The swing member 111 includes opening portions 111h and 111i open to the lower surface of the swing member 111. The opening portion 111h serves as a bottomed spring seat hole in which an elastic member 33 is loaded.

The opening portion 111i communicates with the groove 111a and vertically extends through the swing member 111. The upper end portion of a connecting portion 322 (to be described later) is inserted into the opening portion 111i. A pin insertion hole 111f is formed to extend through the side surface portions of the swing member 111. The pin insertion hole 111f communicates with the opening portion 111i and receives a connecting pin 113.

Two mounting holes (not shown) are formed in the inner side surface of the protruding portion 111d to be spaced apart in the widthwise direction of the swing member 111. Abutment members 114 are fixed to these mounting holes, respectively. The abutment members 114 abut against a pivot regulating member 40. Note that in this embodiment, the swing member 111 and the abutment members 114 are separate members, but may be integrally formed.

The movable portion 12 includes the movable member 121 and an abutment unit 122. The movable member 121 integrally includes a connecting portion 1211 extending obliquely from the upper right to the lower left in the side view of FIG. 11 and a horizontal portion 1212 bent from the connecting portion 1211 and extending in the horizontal direction. An abutment unit 122 is mounted on the horizontal portion 1212 of the movable member 121.

The end portion side of the connecting portion 1211 forms a narrow portion 1211n inserted into the groove 111a of the swing member 111. The narrow portion 1211n has a shaft hole (not shown) which receives the pivot shaft 112. The remaining portion of the connecting portion 1211 has a wide portion 1211w. The end face of the wide portion 1211w abuts against the end face of the protruding portion 111d of the swing member 111 to regulate the pivot range of the movable portion 12 with respect to the swing portion 11. In this embodiment, the counterclockwise pivoting motion of the movable portion 12 about the pivot shaft 112 over the position in FIG. 11 with respect to the swing portion 11 can be regulated.

As in the first embodiment, the movable portion 12 pivots about the pivot shaft 112 with respect to the swing portion 11 along with the pivoting motion of the swing unit 10 about the pivot shaft 54 in this embodiment. At this time, the wide portion 1211w and the protruding portion 111d can prevent the movable portion 12 from pivoting in a direction opposite to the intended direction, thereby assisting the movement of the movable portion 12 by the regulating mechanism 20.

The abutment unit 122 is mounted on the horizontal portion 1212. A groove portion 1212d is formed at the end portion of the horizontal portion 1212. The abutment unit 122 is inserted into the groove portion 1212d and supported by the horizontal portion 1212 to be pivotable about a shaft 1223.

The abutment unit 122 includes an abutment surface 1221 serving as a work abutment portion which abuts against the work. In this embodiment, the abutment surface 1221 serves as the work abutment portion. However, the roller may serve as the work abutment portion as in the first embodiment.

A through hole (not shown) is formed in a vertical wall portion 1212e forming part of the surrounding wall of the groove portion 1212d to extend in the direction of thickness of the vertical wall portion 1212e. The cylinder portion (outer cylinder) of the shock absorber 1225 is inserted into this through hole. The shock absorber 1225 is fixed to the vertical wall portion 1212e, and the rod portion (not shown) of the shock absorber 1225 abuts against the back portion of the abutment unit 122.

Support Member 50

The support member 50 integrally includes a pair of L-shaped wall portions 51, a connecting portion 52 which connects the vertical portions (portions on the pivot shaft 54 side) of the wall portions 51, and a connecting portion 53 which connects the horizontal portion (a portion on the abutment unit 122 side) of the wall portions 51. The support member 50 has a frame-like shape which is open vertically.

The wall portions 51 respectively include bearing holes 51a which support the pivot shaft 54. After the swing member 111 is fitted between the wall portions 51, the pivot shaft 54 is inserted through the bearing holes 51a. Stop rings (not shown) are engaged with the two end portions of the pivot shaft 54. In this manner, the support member 50 and the swing member 111 are assembled and engaged with each other. This makes it possible to allow the support member 50 to support the entire swing unit 10 to be pivotable about the pivot shaft 54.

The wall portions 51 respectively have grooves 51b which receive the pivot regulating member 40. Each groove 51b has an oval shape extending in the vertical direction (parallel to the moving direction of a plunger 321 (to be described later)) and extends through the corresponding wall portion 51 in the direction of thickness. The pivot regulating member 40 has a pin-like shape and is bridged between and engaged with the grooves 51b. The pivot regulating member 40 is vertically movable along the grooves 51b. Stop rings 40a are mounted on the end portions of the pivot regulating member 40 to prevent the pivot regulating member 40 from removal.

Receiving members 41 which support the two end portions of the pivot regulating member 40 upward and elastic members 42 disposed between the receiving members 41 and the bottom portions of the grooves 51b are disposed in the grooves 51b, respectively.

Each receiving member 41 is interposed between the pivot regulating member 40 and the corresponding elastic member 42 to stably transmit the biasing force of the corresponding elastic member 42 to the pivot regulating member 40. In this embodiment, each elastic member 42 comprises a compression spring (coil spring) which always biases the pivot regulating member 40 through the corresponding receiving member 41 upward. The biasing force is smaller than that of the elastic member 33. Note that the elastic member 42 is not limited to the coil spring, but may be any other elastic member in addition to any other compression spring such as a leaf spring. A hole 51c may be formed in the bottom portion of each groove 51b as in the first embodiment.

A portion near each bearing hole 51a in the connecting portion 52 has a horizontal surface to form a pivot regulating surface 52a. When the regulating portion 111e of the swing member 111 abuts against the pivot regulating surface 52a to prevent the swing unit 10 (swing member 111) from pivoting clockwise from the state in FIG. 11. A blind hole 52b is formed in the intermediate portion between the bearing hole 51a and the groove 51b for the pivot shaft 54 in the connecting portion 52. This hole 52b is a spring seat hole into which the elastic member 33 (to be described later) is inserted and loaded.

Regulating Mechanism 20

The regulating mechanism 20 is a mechanism which regulates a moving range so as to guide the pivoting motion of the movable portion 12 about the pivot shaft 112. Providing the regulating mechanism 20 makes it possible to move the movable portion 12 along an intended locus when pivoting the swing unit 10 about the pivot shaft 54.

In this embodiment, the regulating mechanism 20 includes a pin 21 and a guide groove 22. The pin 21 is inserted into the pin insertion hole 1212c of the movable member 121 to form a portion protruding from the side surface portion of the movable member 121. The guide groove 22 is formed in one of the pair of wall portions 51.

The end portion of the pin 21 is engaged with the guide groove 22 to allow the guide groove 22 to guide the movable portion 12. Note that in this embodiment, the pin 21 serves as an engaging portion on the movable portion 12 side, while the guide groove 22 serves as an immovable engaging portion on the wall portion 51 side. The layout positions of the pin and the guide groove may be reversed. In this embodiment, as described with reference to the first embodiment, the guide groove 22 and the groove 51b can be formed using the common support member 50. This is advantageous in forming the guide groove 22 and the groove 51b in terms of their positional accuracy.

Unlike in the first embodiment, the entire guide groove 22 extends obliquely downward in the downstream side of the convey direction. For this reason, when the swing portion 11 of the swing unit 10 pivots counterclockwise about the pivot shaft 54 from the state in FIG. 11, the movable portion 12 moves almost straight obliquely downward.

Driving Unit 30

The driving unit 30 drives the swing unit 10 to pivot about the pivot shaft 54. The driving unit 30 includes the elastic member 33. In this embodiment, the elastic member 33 comprises a push spring (coil spring) and is loaded between the opening portion 111h of the swing member 111 and the hole 52b of the connecting portion 52. The elastic member 33 always biases the swing unit 10 upward to maintain the state of FIG. 11 (the state in which the regulating portion 111e abuts against the pivot regulating surface 52a to regulate pivoting motion of the swing member 111). Note that the elastic member 33 need not be limited to the coil spring, and any other elastic member can be used in addition to any other compression spring made such as a leaf spring.

The driving unit 30 further includes an electrically driven driving portion 31 and a movable portion 32 moved by the driving portion 31. The movable portion 32 includes a plunger 321, a connecting portion 322 which connects the plunger 321 and the swing unit 10, and a connecting pin 323. Note that the driving portion 31 may be surrounded by a case 60 as in the first embodiment.

In this embodiment, the driving portion 31 and the plunger 321 constitute a pull solenoid. Upon energization of the cylindrical driving portion 31 (electromagnet), a driving force acts in only the direction (downward) in which the plunger 321 is drawn into the cylinder of the driving portion 31. That is, the pull solenoid does not generate a driving force in a direction (upward) to pull out the plunger 321 from the cylinder of the driving portion 31. In this embodiment, the pull solenoid is employed, but any other electrically driven actuator such as a motor may be used. Note the same effect as described above can be obtained even if a known actuator except an electrically driven actuator (for example, an air cylinder) may be used in place of the electrically driven actuator. Use of the pull solenoid can make it possible to obtain a compact apparatus.

As in the first embodiment, a slit (recessed portion) 321a is formed at the upper end portion of the plunger 321 to engage with and receive one end portion (lower end portion) of the connecting portion 322. A pin insertion hole 321b extending through the plunger 321 radially is formed in the peripheral surface of the upper end portion of the plunger 321.

As in the first embodiment, the connecting portion 322 is connected to the plunger 321 to be pivotable about the connecting pin 323. Note that in this embodiment, unlike the first embodiment, the intermediate portion of the connecting portion 322 is almost straight.

A connecting hole 322d is formed in the upper portion of the main body 322 to receive the connecting pin 113 serving as a shaft member. The connecting hole 322d is a hole elongated in the vertical direction. The upper end portion of the connecting portion 322 is inserted into the opening portion 111i of the swing member 111. The connecting pin 113 is inserted into the pin insertion hole 111f of the swing member 111 and the connecting hole 322d, thereby engaging the connecting portion 322 with the swing member 111. Since the connecting hole 322d is an elongated hole, the connecting portion 322 and the swing member 111 are fitted with a predetermined play (loosely fitted).

An abutment portion 322b is formed below the connecting hole 322d. The abutment portion 322b abuts against the uppermost portion of the peripheral surface of the pivot regulating member 40 and engages with the pivot regulating member 40.

In this embodiment, the connecting portion 322 is connected to the electrically driven unit 30 relatively on the upstream side of the convey direction and is connected to the swing member 111 relatively on the downstream side of the convey direction. With this connecting structure, there is implemented a structure in which the electrically driven unit 30 is located below the roller 1221 abutting against the work. As a result, there can be provided a pivot type stopping apparatus while locating the driving source at the same position as the conventional stopping apparatus of a type in which the abutment portion abutting the work is reciprocally moved along a straight line.

Reverse Feed Preventing Apparatus 70

The reverse feed preventing apparatus 70 includes a main body 71 fixed to one wall portion 51 of the support member 50 and an abutment portion 72 pivotably connected to the main body 71 to be pivotable about a shaft 73. When stopping the conveyance of the work W, the distal end portion of the work W interferes with an abutment portion 72. At this time, the abutment portion 72 pivots in a direction indicated by an arrow in FIG. 8 and allows passage of the work W. The work W having passed by the abutment portion 72 abuts against the abutment surface 1221 of the abutment unit 122 to stop the conveyance of the work W, as will be described later. In this case, the work W may be moved in a direction opposite to the convey direction due to the impact of abutment with the abutment surface 1221. In this case, a distal end flange portion Weg (see FIG. 11) of the work W may be caught by the abutment portion 72, thereby preventing the reverse feed of the work W.

Operation Example of Stopping Apparatus 1'

The operation of the stopping apparatus 1' is the same as that of the stopping apparatus 1 of the first embodiment. FIG. 11 corresponds to the state of FIG. 4 in the first embodiment. That is, FIG. 11 shows a state immediately before the work W conveyed from the left to the right in the horizontal direction is stopped. The swing unit 10 of the stopping apparatus 1' is located at the abutment position where the abutment surface 1221 of the abutment unit 122 abuts against the work W. At this abutment position, the abutment surface 1221 extends upward from the lower surface of the work W, that is, the convey surface L.

The elastic member 33 applies the biasing force in a direction where the swing unit 10 is located at the abutment position (that is, the direction is upward in FIG. 11, defines the horizontal state of the swing member 111 as the upper limit, and is a counterclockwise direction pivotable about the pivot shaft 54). Note that as described above, since the pivot regulating surface 52*a* of the connecting portion 52 abuts against the regulating portion 111*e* of the swing member 111, the swing unit 10 does not further pivot clockwise from the state in FIG. 11.

In the state of FIG. 11, the driving portion 31 is set in the non-driving state. The pivot regulating member 40 is located at the upper end of the groove 51*b* by the biasing force of the elastic member 42. The pivot regulating member 40 abuts against the abutment portion 322*b* of the connecting portion 322 and is set in the engaging state. Since the driving portion 31 is set in the non-driving state, the connecting portion 322 and the plunger 321 are pushed up to the uppermost positions through the pivot regulating member 40 by the biasing force of the elastic member 42. The connecting pin 113 is located at the lowermost position of the connecting hole 322*d*. As described above, the elastic member 42 applies the biasing force in a direction in which the pivot regulating member 40 is engaged with the connecting portion 322.

When the work W abuts against the abutment surface 1221 in the state of FIG. 11, the work W is stopped at a predetermined stop position. In this embodiment, the abutment unit 122 having the abutment surface 1221 is pivotable about the shaft 1223. For this reason, in a stage in which the work W starts abutting against the abutment surface 1221, the convey force of the work W does not act in a direction in which the entire swing unit 10 pivots. Only the abutment unit 122 pivots clockwise as indicated by an arrow in FIG. 12. Since a movable member 1222 starts abutting against the distal end of the rod portion (not shown) of the shock absorber 1225 upon pivoting motion of the abutment unit 122, the impact of the collision between the work W and the abutment surface 1221 can be buffered by the shock absorber 1225.

When the work W is abutted, the convey force of the work W acts in a direction to pivot the movable portion 12 about the pivot shaft 112 clockwise. A force which pivots the swing portion 11 about the pivot shaft 54 counterclockwise acts on the swing portion 11. That is, a force to bend the movable portion 12 and the swing portion 11 is generated.

However, since the pivot regulating member 40 and the abutment member 114 of the swing member 111 abut against each other and are kept in the engaging state, thereby regulating the pivoting motion of the swing portion 11. The pivoting motion of the movable portion 12 is also regulated upon abutment between the pin 21 and the upper end portion of the guide groove 22.

As described above, according to this embodiment, the pivoting motions of the swing portion 11 and the movable portion 12 can be firmly and strictly regulated without using the driving force of the driving portion 31. This makes it possible to stop the work W at the predetermined stop position.

Next, an operation (stop-canceling process) will be described below in which by driving the driving portion 31, the abutment surface 1221 is retracted below the lower surface of the work W, the swing unit 10 is pivoted to the retracted position where the work W and the roller 1221 do not contact, and the stopping apparatus 1' can pass by the work W. The operation is the same as in the first embodiment.

Figure 12:
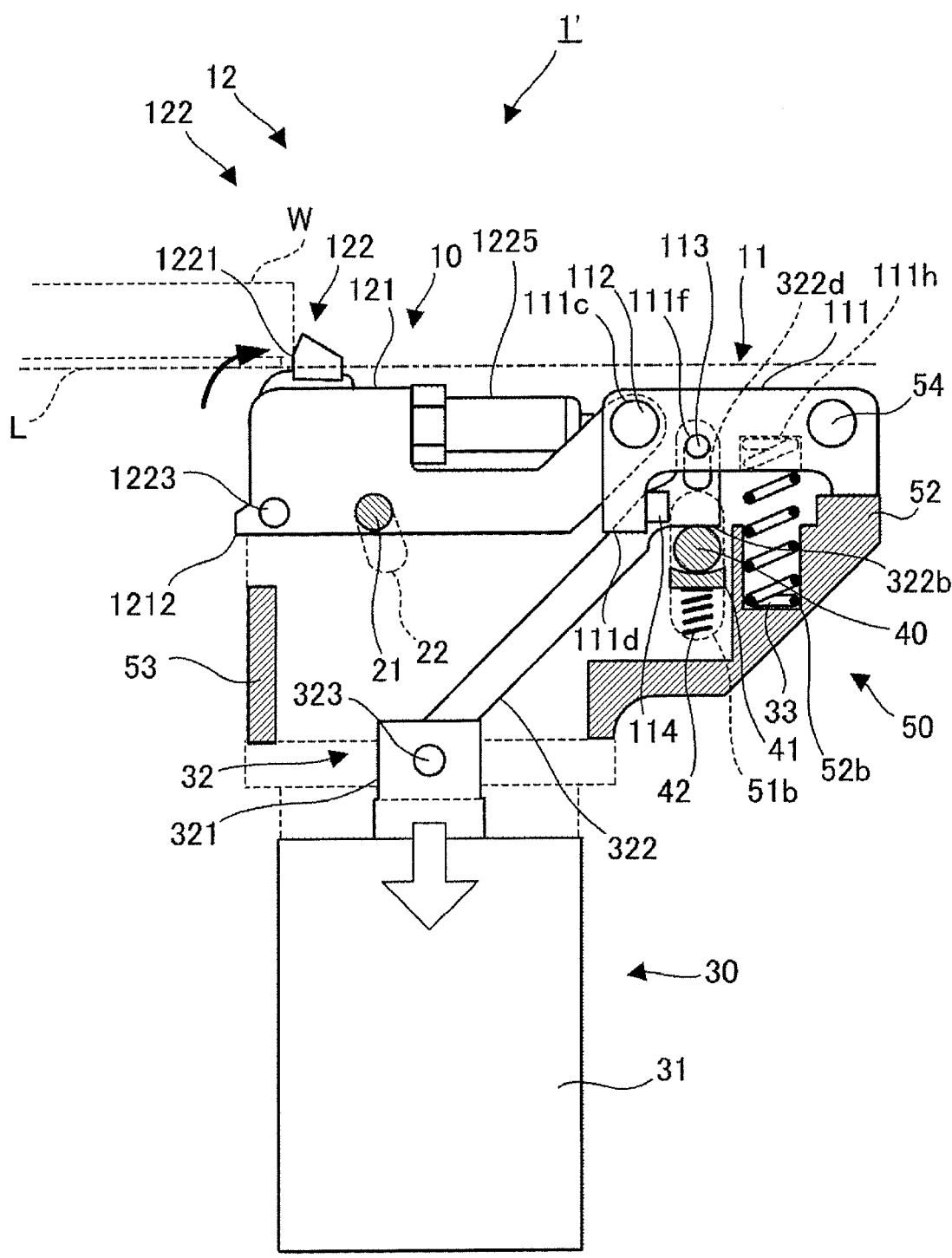
FIG. 12 is a view for explaining the operation of the stopping apparatus shown in FIG. 8.

The driving portion 31 moves the plunger 321 in a direction to pivot the swing unit 10 toward the retracted position side against the biasing force of the elastic member 33. FIG. 12 shows a state corresponding to a state ST2 of the first embodiment. That is, FIG. 12 shows an initial state in which the driving portion 31 is started to drive the plunger 321 downward (the plunger 321 is drawn into the driving portion 31). Since the pivot regulating member 40 engages with the connecting portion 322, the pivot regulating member 40 also moves downward interlockingly with the movement of the plunger 321 and the connecting portion 322.

Since the moving direction of the plunger 321 is parallel to the longitudinal direction of the groove 51*b*, the pivot regulating member 40 moves in a direction parallel to the moving direction of the plunger 321. When the pivot regulating member 40 moves below the position of the state in FIG. 12 (a state in which the connecting pin 113 is located at the upper end of the connecting hole 322), engagement (abutment) between the pivot regulating member 40 and the abutment member 114 is canceled. As described with reference to the first embodiment, the moving range of the pivot regulating member 40 when the pivot regulating member 40 engages with the abutment member 114 is called a regulation region. The moving range of the pivot regulating member 40 when the pivot regulating member 40 does not engage with the abutment member 114 is called a non-regulation region.

The connecting hole 322*d* is an elongated hole. The connecting pin 113 is loosely fitted in the connecting hole 322*d*. The length of the elongated hole is set such that the swing member 111 and the connecting portion 322 are set in the non-connecting state until the pivot regulating member 40 falls outside the regulation region, and the pivot force is not applied from the driving portion 31 to the swing unit 10. When the pivot regulating member 40 reaches the non-regulation region, the upper portion of the peripheral surface of the connecting pin 113 seats on the upper portion of the connecting hole 322*d*. This makes is possible to set the swing member 111 and the connecting portion 322 in the connecting state, so that the pivot force is applied from the driving portion 31 to the swing unit 10.

As in the first embodiment, in the second embodiment, the connecting portion 322 and the swing member 111 are connected with each other with a delay from the movement of the plunger 321 and the pivot regulating member 40. This is because a state can be prevented in which the pivot force applied from the driving portion 31 to the swing unit 10 before the pivot regulation of the swing unit 10 by the pivot regulating member 40 is canceled is wasted.

The subsequent operations are almost the same as in the states ST3 and ST4 of the first embodiment. That is, in a state in which the swing unit 10 and the connecting portion 322 are set in the connecting state and the pivot regulating member 40 moves to the non-regulation region, when the plunger 321 further moves downward, the swing unit 10 pivots counterclockwise (downward) against the biasing force of the elastic member 33. The abutment unit 12 starts moving downward to the retracted position. When the abutment unit 12 reaches the retracted position, the stop of the work is canceled.

When pivoting the swing unit 10 to the retracted position, the movable portion 12 pivots with respect to the swing portion 11. The intermediate portion (pivot shaft 112) of the swing unit 10 is bent. The regulating mechanism 20 guides the pivoting motion of the movable portion 12 about the pivot shaft 112. The movable portion 12 pivots clockwise (upward) with respect to the swing portion 11. As a result, the distance between the pivot shaft 54 and the abutment surface 1221 becomes short upon pivoting motion of the swing unit 10 from the abutment position to the retracted position. This makes it possible to prevent the work W from pushing back toward the upstream side. That is, when pivoting the movable portion 12 from the abutment position to the retracted position, a force for pushing back the work W toward the upstream side need not be considered for the pivot force.

Third Embodiment

Figure 13:
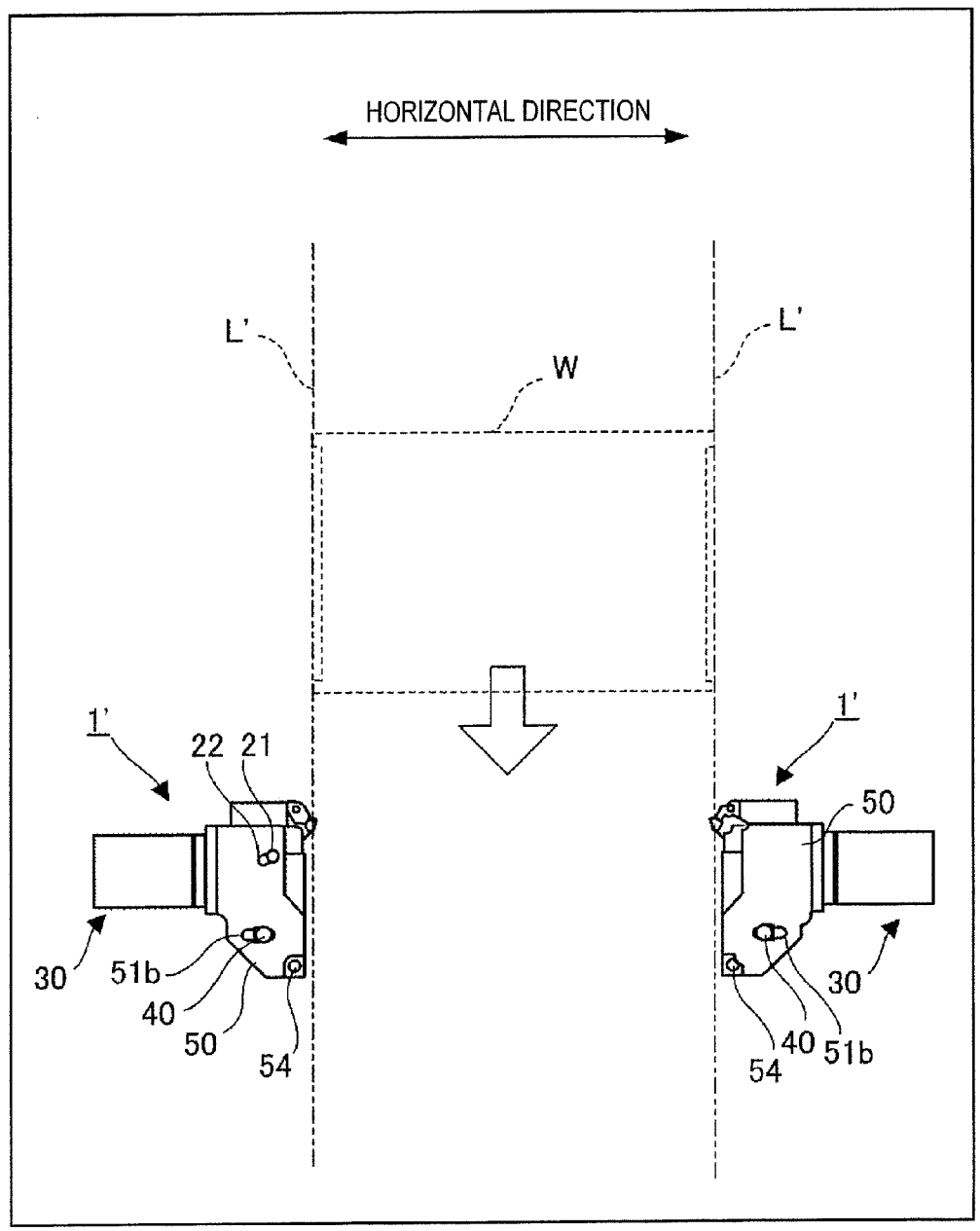
FIG. 13 is a view showing another layout of the stopping apparatus shown in FIG. 8.

The first and second embodiments exemplify cases in which the stopping apparatuses 1 and 1' are located on the lower side of the convey locus of the work W. However, the layout positions of the stopping apparatuses 1 and 1' need not be limited to these. For example, stopping apparatuses may be positioned on the upper side of the convey locus of the work W or may be positioned on the sides of the convey locus. In either case, the effects of the first and second embodiments can be obtained. FIG. 13 shows a case in which stopping apparatuses 1' are located on the sides of the convey locus of a work W. In this case, the stopping apparatuses 1' are exemplified, but the same also applies to the stopping apparatuses 1.

In the example of FIG. 13, the pair of stopping apparatuses 1' are located to be spaced apart from each other in the horizontal direction. In other words, the pair of stopping apparatuses 1' in FIG. 11 are fallen sideways and are disposed to face each other at the same level as a convey surface L'-L'. The stopping apparatuses 1' are disposed so that the axial directions of the pivot shafts 54 face the vertical direction. The convey surface L' is the position where the right and left portions of the work W pass, out of the convey locus of the work W. In the structure shown in FIG. 13, each swing unit 10 swings on the horizontal surface about the corresponding pivot shaft 54. At the abutment position, each abutment surface 1221 protrudes inside the region of the convey surface L'-L'. The abutment surface 1221 falls outside the region of the convey surface L'-L' at the retracted position.

Fourth Embodiment

Figure 14:
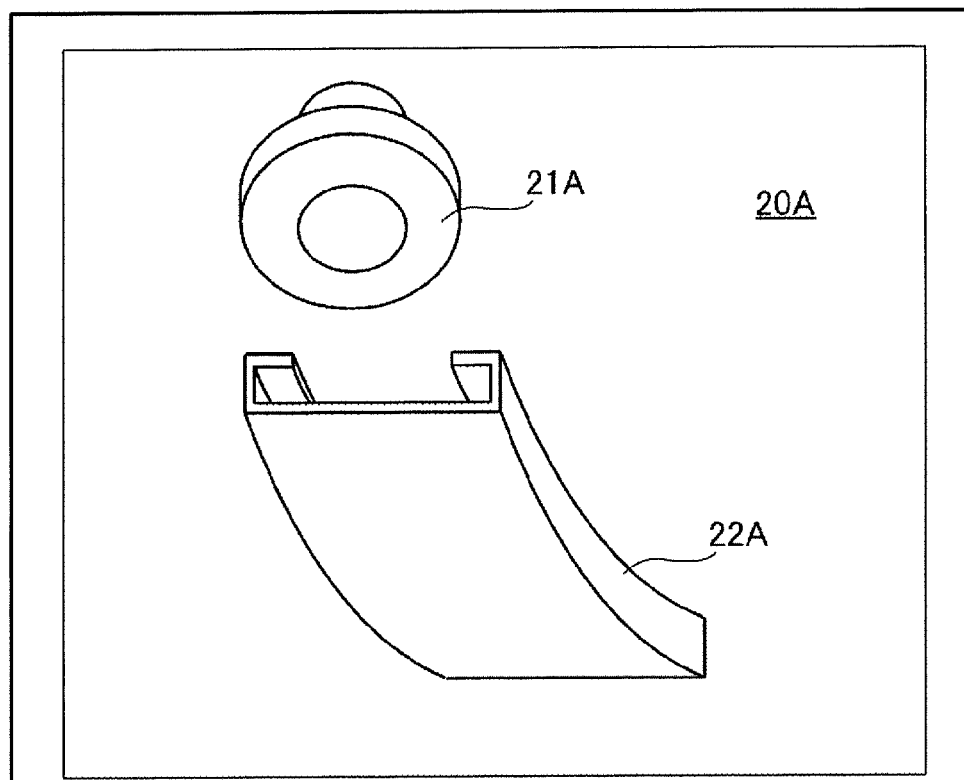
FIG. 14 is a view showing another example of a regulating mechanism.
Figure 14:
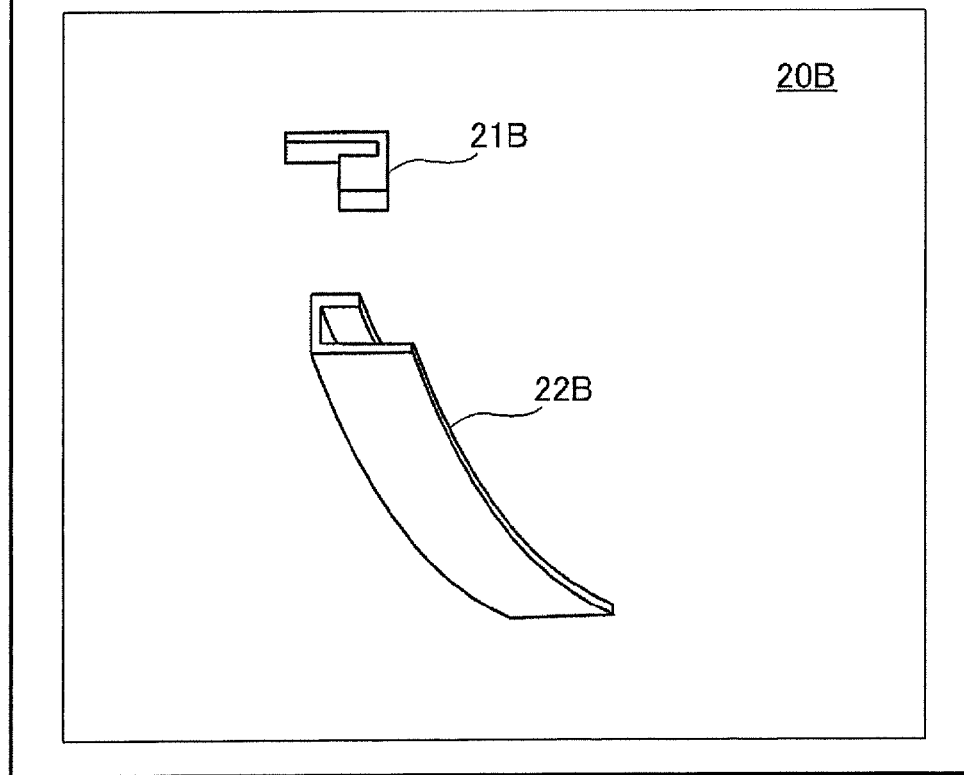

In each of the first and second embodiments, the regulating mechanism 20 includes the pin 21 and the guide groove 22. However, the structure of the regulating mechanism 20 is not limited to this. FIG. 14 is a view showing two examples of a regulating mechanism 20.

A regulating mechanism 20A is designed such that a roller 21A serves as an engaging portion on the side of a movable portion 12, and a rail member 22A serves as an immobile engaging portion on the side of a wall portion 51. The roller 21A is swingable in the rail member 22A. The pivoting motion of the movable portion 12 can be guided in conformity with the rail shape of the rail member 22A. Note that the roller 21A may serve as an immobile engaging portion on the side of the wall portion 51, and the rail member 22A may serve as an engaging portion on the side of the movable portion 12.

A regulating mechanism 20B is designed such that a slide member 21B serves as an engaging portion on the side of the movable portion 12, and a rail member 22B serves as an immobile engaging portion on the side of the wall portion 51. The slide member 21B is slidable in the rail member 22B, and the pivoting motion of the movable portion 12 can be guided in conformity with the rail shape of the rail member 22A. Note that the slide member 21B may serve as an immobile engaging portion on the side of the wall portion 51, and the rail member 22B may serve as an engaging portion on the side of the movable portion 12.

Other Embodiments

The present invention is not limited to the above embodiments. Various changes and modification can be made without departing from the spirit and scope of the present invention. Therefore, to apprise the public of the scope of the present invention, the following claims are made.

What is claimed is:

1. A stopping apparatus that abuts against a work being conveyed to stop the work, comprising:
 a swing unit that is pivotable about a first pivot shaft on a downstream side of a predetermined stop position in a convey direction of the work between an abutment position where said swing unit abuts against the work being conveyed at the predetermined stop position to stop conveyance of the work and a retracted position which allows passage of the work,
 a driving unit that pivots said swing unit,
 a regulating mechanism, and
 a pivot regulating member,
 wherein said swing unit comprises:
 a swing portion that is pivotable about the first pivot shaft, and
 a movable portion including an abutment portion which abuts against the work,
 wherein said movable portion includes a first end and a second end,
 wherein said abutment portion is provided at a side of the first end,
 wherein said movable portion is connected to said swing portion to be pivotable through a second pivot shaft at a side of the second end,
 wherein said second pivot shaft is parallel to said first pivot shaft,
 wherein said regulating mechanism regulates a moving range of a portion between said abutment portion and said second pivot shaft in said movable portion and guides a pivoting motion of said movable portion about said second pivot shaft,
 wherein said pivot regulating member performs pivot regulation of said swing unit by engagement with said swing portion and cancellation of the pivot regulation, and
 wherein when a work being conveyed abuts against said abutment portion in the abutment position:
 a convey force of the work is received by at least said regulating mechanism and said pivot regulating member,
 pivoting of said movable portion about said second pivot shaft is regulated by said regulating mechanism, and
 pivoting of said swing portion about said first pivot shaft is regulated by said pivot regulating member.

2. The stopping apparatus according to claim 1, wherein said driving unit comprises a swing unit elastic member that applies a biasing force to said swing unit in a direction in which said swing unit is located to the abutment position.

3. The stopping apparatus according to claim 2, wherein said driving unit comprises an electrically driven actuator that pivots said swing unit to a side of the retracted position.

4. The stopping apparatus according to claim 1, wherein said regulating mechanism comprises:
 a first engaging portion formed in said movable portion, and
 an immobile second engaging portion engaged with said first engaging portion.

5. The stopping apparatus according to claim 1, wherein said movable portion pivots in one direction about the second pivot shaft with respect to said swing portion along with pivoting motion of said swing unit from the abutment position to the retracted position, and
 a regulating portion is provided with each of said movable portion and said swing portion, the regulating portion of said movable portion and the regulating portion of said swing portion abutting against each other to regulate pivoting motion of said movable portion over the predetermined position in a direction opposite to the one direction with respect to said swing portion.

6. The stopping apparatus according to claim 1, wherein said driving unit comprises:
a swing unit elastic member that applies a biasing force to said swing unit in a direction to locate said swing unit to the abutment position, and
an electrically driven actuator including a connecting portion connected to said swing unit and a driving portion that moves said connecting portion in a direction to pivot said swing unit to the side of the retracted position,
said stopping apparatus further comprises a pivot regulating member that performs pivot regulation of said swing unit by engagement with said swing unit by moving interlockingly with an operation of said driving unit and cancellation of the pivot regulation,
said pivot regulating member is arranged to be movable interlockingly with movement of said connecting portion in a range from a regulation region which regulates pivoting motion of said swing unit to a non-regulation region that allows pivoting motion of said swing unit,
said swing unit comprises a shaft member connected to said connecting portion, and
said connecting portion includes an elongated hole that receives said shaft member so that said connecting portion is not connected to said swing unit when said pivot regulating member falls within the regulation region and is connected to said swing unit when said pivot regulating member falls within the non-regulation region.

7. A stopping method for causing a stopping apparatus to abut against a work being conveyed to stop the work,
the stopping apparatus comprising a swing unit, a regulating mechanism and a pivot regulating member,
the swing unit including an abutment portion that abuts against the work being conveyed,
the swing unit being pivotable about a first pivot shaft on a downstream side of the predetermined stop position in a convey direction of the work between an abutment position where the abutment portion abuts against the work being conveyed at a predetermined stop position to stop conveyance of the work and a retracted position which allows passage of the work,
the swing unit comprising:
a swing portion that is pivotable about the first pivot shaft, and
a movable portion including the abutment portion,
the movable portion including a first end and a second end,
the abutment portion being provided at a side of the first end,
the movable portion being connected to the swing portion to be pivotable through a second pivot shaft at a side of the second end,
the second pivot shaft being parallel to said first pivot shaft,
the regulating mechanism regulating a moving range of a portion between the abutment portion and the second pivot shaft in the movable portion and guiding a motion of the movable portion about said second pivot shaft, and
the pivot regulating member performing pivot regulation of the swing unit by engagement with the swing portion and cancellation of the pivot regulation,
the method comprising;
a step of causing the work abutment portion to abut against the work, and
a step of stopping the work,
wherein said step of stopping the work includes:
a step of regulating a pivoting motion of the movable portion about the second pivot shaft in a first direction by the regulating mechanism against a bending force between the movable portion and the swing unit due to a convey force of the work, and
a step of regulating a pivoting motion of the swing portion about the first pivot shaft in a second direction opposed to the first direction by the pivot regulating member against the bending force.

8. A stopping and stop-canceling method for causing a stopping apparatus to abut against a work being conveyed to stop the work and then canceling the stop of the work,
the stopping apparatus comprising a swing unit, a regulating mechanism and a pivot regulating member,
the swing unit including an abutment portion that abuts against the work being conveyed at a predetermined stop position to stop conveyance of the work,
the swing unit being pivotable about a first pivot shaft on a downstream side of the predetermined stop position in a convey direction of the work between an abutment position where the abutment portion abuts against the work being conveyed at the predetermined stop position to stop conveyance of the work and a retracted position which allows passage of the work,
the swing unit comprising:
a swing portion that is pivotable about the first pivot shaft, and
a movable portion including the abutment portion,
the movable portion including a first end and a second end,
the abutment portion being provided at a side of the first end,
the movable portion being connected to the swing portion to be pivotable through a second pivot shaft at a side of the second end,
the second pivot shaft being parallel to said first pivot shaft,
the regulating mechanism regulating a moving range of a portion between the abutment portion and the second pivot shaft in the movable portion and guiding a motion of the movable portion about said second pivot shaft, and
the pivot regulating member performing pivot regulation of the swing unit by engagement with the swing portion and cancellation of the pivot regulation,
the method comprising;
a step of causing the work abutment portion to abut against the work,
a step of stopping the work, and
a step of canceling the stop of the work,
wherein said step of stopping the work includes:
a step of regulating a pivoting motion of the movable portion about the second pivot shaft in a first direction by the regulating mechanism against a bending force between the movable portion and the swing unit due to a convey force of the work, and
a step of regulating a pivoting motion of the swing portion about the first pivot shaft in a second direction opposed to the first direction by the pivot regulating member against the bending force, and
wherein said step of canceling the stop of the work includes a step of pivoting the swing portion about the first pivot shaft in the second direction and pivoting the movable portion about the second pivot shaft in the first direction with guiding the movable portion by the regulating mechanism.

* * * * *